United States Patent
Zimmerman

(10) Patent No.: US 11,309,629 B2
(45) Date of Patent: *Apr. 19, 2022

(54) MULTIPLEXED ANTENNAS THAT SECTOR-SPLIT IN A FIRST BAND AND OPERATE AS MIMO ANTENNAS IN A SECOND BAND

(71) Applicant: CommScope Technologies LLC, Hickory, NC (US)

(72) Inventor: Martin L. Zimmerman, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 34 days.

This patent is subject to a terminal disclaimer.

(21) Appl. No.: 16/913,105

(22) Filed: Jun. 26, 2020

(65) Prior Publication Data

US 2020/0328511 A1     Oct. 15, 2020

Related U.S. Application Data

(63) Continuation of application No. 16/430,756, filed on Jun. 4, 2019, now Pat. No. 11,018,427.

(Continued)

(51) Int. Cl.
*H01Q 3/40* (2006.01)
*H01Q 21/00* (2006.01)
(Continued)

(52) U.S. Cl.
CPC .............. *H01Q 5/50* (2015.01); *H01Q 1/246* (2013.01); *H01Q 3/40* (2013.01);
(Continued)

(58) Field of Classification Search
CPC .......... H01Q 1/246; H01Q 1/24; H01Q 21/00; H01Q 21/0025; H01Q 21/06;
(Continued)

(56) References Cited

U.S. PATENT DOCUMENTS 3,518,695 A   6/1970 Schroeder
5,333,001 A   7/1994 Profera
(Continued)

OTHER PUBLICATIONS

Notification of Transmittal of the International Search Report and the Written Opinion of the International Searching Authority, or the Declaration corresponding to International Application PCT/US2019/035312, dated Aug. 2, 2019.

*Primary Examiner* — Tho G Phan
(74) *Attorney, Agent, or Firm* — Myers Bigel, P.A.

(57) ABSTRACT

Base station antennas include a plurality of multiplexer filters and a multi-column array of radiating elements that includes a plurality of sub-arrays. Each filter may have a first and second ports that are configured to pass RF signals in respective first and second frequency bands and a third common port that is coupled to a respective one of a plurality of sub-arrays. These antennas also include first frequency band ports that are coupled to the first ports of respective subsets of the multiplexer filters and second frequency band ports that are coupled to the second ports of at least some of the multiplexer filters. The antenna may operate as a MIMO sector antenna in the first frequency band and as a sector-splitting antenna in the second frequency band.

18 Claims, 13 Drawing Sheets

Related U.S. Application Data

(60) Provisional application No. 62/714,399, filed on Aug. 3, 2018.

(51) Int. Cl.
*H01Q 5/50* (2015.01)
*H01Q 1/24* (2006.01)
*H01Q 21/06* (2006.01)
*H04W 16/28* (2009.01)

(52) U.S. Cl.
CPC ....... *H01Q 21/0025* (2013.01); *H01Q 21/061* (2013.01); *H04W 16/28* (2013.01)

(58) Field of Classification Search
CPC .......... H01Q 21/061; H01Q 3/40; H01Q 5/50; H01Q 21/0006; H01Q 21/08; H01Q 21/30; H01Q 25/00; H04W 16/28; H04B 1/00; H04B 1/0057; H04B 7/0617
See application file for complete search history.

(56) References Cited

U.S. PATENT DOCUMENTS

| | | | |
|---|---|---|---|
| 5,982,337 A | 11/1999 | Newman et al. | |
| 6,084,541 A | 7/2000 | Sayegh | |
| 9,325,065 B2 | 4/2016 | Veihl et al. | |
| 9,722,327 B2* | 8/2017 | Zimmerman | H01Q 1/246 |
| 9,831,548 B2 | 11/2017 | Timofeev et al. | |
| 10,243,263 B2 | 3/2019 | Resnati et al. | |
| 11,018,427 B2* | 5/2021 | Zimmerman | H04B 1/0057 |
| 11,031,678 B2* | 6/2021 | Li | H04B 1/0057 |
| 2013/0229308 A1* | 9/2013 | Pu | H01Q 3/40 342/373 |
| 2013/0235806 A1 | 9/2013 | Nilsson et al. | |
| 2015/0244072 A1 | 8/2015 | Harel | |
| 2016/0248158 A1 | 8/2016 | So et al. | |
| 2018/0233820 A1* | 8/2018 | Chen | H01Q 3/24 |

\* cited by examiner

MULTIPLEXED ANTENNAS THAT SECTOR-SPLIT IN A FIRST BAND AND OPERATE AS MIMO ANTENNAS IN A SECOND BAND

CROSS-REFERENCE TO RELATED APPLICATION

The present application claims priority to U.S. patent application Ser. No. 16/430,756, filed Jun. 4, 2019, which in turn claims priority to U.S. Provisional Patent Application Ser. No. 62/714,399, filed Aug. 3, 2018, the entire content of each of which is incorporated herein by reference.

BACKGROUND

The present invention generally relates to wireless communications and, more particularly, to base station antennas that are suitable for use in cellular communications systems.

Cellular communications systems are well known in the art. In a typical cellular communications system, a geographic area is divided into a series of regions that are referred to as "cells," and each cell is served by a base station. The base station may include baseband equipment, radios and base station antennas that are configured to provide two-way radio frequency ("RF") communications with subscribers that are positioned throughout the cell. In many cases, the cell may be divided into a plurality of "sectors," and separate base station antennas provide coverage to each of the sectors. The antennas are often mounted on a tower or other raised structure, with the radiation beam ("antenna beam") that is generated by each antenna directed outwardly to serve a respective sector. Typically, a base station antenna includes one or more phase-controlled arrays of radiating elements, with the radiating elements arranged in one or more vertical columns when the antenna is mounted for use. Herein, "vertical" refers to a direction that is generally perpendicular relative to the plane defined by the horizon. Reference will also be made herein to (1) the azimuth plane, which refers to a plane that bisects the base station antenna that is parallel to the plane defined by the horizon and (2) to the elevation plane, which refers to a plane extending along the boresight pointing direction of the base station antenna that is perpendicular to the azimuth plane.

A very common base station configuration is a so-called "three sector" configuration in which the cell is divided into three 120° sectors in the azimuth plane. A base station antenna is provided for each sector. In a three sector configuration, the antenna beams generated by each base station antenna typically have a Half Power Beamwidth ("HPBW") in the azimuth plane of about 65° so that the antenna beams provide good coverage throughout a 120° sector. Three of these base station antennas will therefore provide full 360° coverage in the azimuth plane. Typically, each base station antenna will include a so-called linear array of radiating elements that includes a plurality of radiating elements that are arranged in a vertically-extending column, Each radiating element may have a HPBW of approximately 65° so that the antenna beam generated by the linear array will provide coverage to a 120° sector in the azimuth plane. By providing a column of radiating elements extending along the elevation plane, the elevation HPBW of the antenna beam may be narrowed to be significantly less than 65°, with the amount of narrowing increasing with the length of the column.

As demand for cellular service has grown, cellular operators have upgraded their networks to dramatically increase network capacity and to support new generations of service. The new generations of service that have been added typically operate in different frequency bands from existing generations to avoid interference. When these new services are introduced, the existing "legacy" services typically must be maintained to support legacy mobile devices. Thus, as new services are introduced, either new cellular base stations must be deployed or existing cellular base stations must be upgraded to support the new services. In order to reduce cost, many cellular base stations support two, three, four or more different types or generations of cellular service. To reduce the number of antennas on the towers of such base stations, many operators deploy antennas that communicate in multiple frequency bands to support multiple different cellular services.

One way of supporting service in multiple frequency bands from a single base station antenna is to include multiple linear arrays of radiating elements on the antenna, with different ones of the linear arrays operating in different frequency bands. Another approach is to use so-called "wideband" radiating elements that can transmit and receive RF signals in more than one frequency band. For example, there are a number of different frequency bands in the 1.7-2.7 GHz frequency range including the 1695-2180 MHz band and the 2490-2690 MHz band. Wideband radiating elements are known in the art that can transmit signals that are anywhere within the 1.7-2.7 GHz frequency range. Diplexers may be included in the base station antenna that combine signals from both the low-band (here the 1695-2180 MHz band) and the high-band (here the 2490-2690 MHz band) in the transmit path for transmission through a single array of radiating elements, and that divide out signals in the receive path to provide the low-band signals to a low-band radio and the high-band signals to a high-band radio. Thus, the use of wideband radiating elements may allow a single array of radiating elements to support service in multiple frequency bands.

As the volume of cellular traffic continues to grow, cellular operators are also under pressure to support increased levels of capacity per base station in various of the frequency bands. Several known techniques for increasing capacity include the use of high gain beam-forming antennas, the use of multi-input-multi-output or ("MIMO") transmission techniques and the use of sector-splitting.

Beam-forming antennas refer to antennas that have multiple columns of radiating elements that are fed by different ports of a radio. A radio may modulate an RF signal and then send it to transceivers associated with each output port of the radio ("radio port"). The amplitude and phase of the RF signal for each radio port may be set by the radio so that the columns of radiating elements work together to form a more focused, higher gain antenna beam that has a narrowed beam width in, for example, the azimuth plane. The antenna beam can typically be scanned over a wide range of pointing angles in the azimuth plane (i.e., scanned off of the boresight pointing direction of the antenna) by appropriate adjustments to the amplitude and phase of the RF signal for each radio port. The size and/or pointing direction of the antenna beams may be changed on a time slot-by-time slot basis in a time division duplex (TDD) transmission scheme in order to increase the antenna gain in the direction of selected users during each time slot. The column spacing (i.e., the horizontal distance between adjacent vertically-oriented linear arrays of radiating elements) of a beam-forming antenna is typically relatively small (e.g., $0.65\lambda$ or less, where $\lambda$ is the wavelength of the center frequency of the operating frequency band). Since beam-forming antennas have the ability to generate narrow antenna beams, they may exhibit significantly higher antenna gains and thus support increased capacity and produce lower levels of interference with neighboring sectors.

MIMO operation is another technique for increasing the capacity of a base station. MIMO refers to a technique where multiple data streams are output through respective ports of a radio and transmitted through multiple different antenna arrays (or sub-arrays) that are, for example, spatially separated from one another and/or at orthogonal polarizations. MIMO exploits multipath propagation and hence may rely on the transmission paths being relatively independent, which generally requires a larger spacing between the columns of radiating elements (e.g., a spacing of a wavelength or more). The use of MIMO transmission techniques may help overcome the negative effects of multipath fading, reflections of the transmitted signal off of buildings and the like to provide enhanced transmission quality and capacity.

Sector-splitting refers to a technique where the coverage area for a base station is divided into more than three sectors, with six, nine and even twelve sectors being used in various sector-splitting applications. For example, a six sector base station will have six 60° sectors in the azimuth plane. Splitting each 120° sector into multiple smaller sub-sectors increases system capacity because each antenna can service a smaller area and therefore provide higher antenna gain, and because sector-splitting also may allow for frequency reuse within a 120° sector. In sector-splitting applications, a single multi-beam antenna is typically used for each 120° sector. The multi-beam antenna generates two or more antenna beams within the same frequency band, thereby splitting the sector into two or more smaller sectors. Sector-splitting typically requires multiple linear arrays of radiating elements. The two common approaches for sector-splitting are sector-splitting using beam-forming networks such as a Butler Matrix and sector-splitting using lensed antennas.

In the first sector-splitting approach, multiple linear arrays are connected to, for example, a pair of ports via a feed network that includes a Butler matrix or other beam-forming network. In a six-sector configuration where each 120° sector is split in two, the beam-forming network generates two independent, side-by-side antenna beams that each have an azimuth HPBW of about 33° and that together cover the 120° sector. The first port generates the first antenna beam and the second port generates the second antenna beam. Assuming that the boresight pointing direction for the sector is 0° in the azimuth plane, then the antenna beams will have azimuth pointing directions of about −30° and 30°, respectively.

In the second sector-splitting approach, an RF lens is included in the base station antenna and the multiple linear arrays are configured to transmit and receive signals in different directions through the RF lens. The RF lens may be used to narrow the azimuth beam width of the antenna beams generated by the linear arrays to beam widths that are suitable for providing service to a sub-sector. Thus, for example, for a six sector base station served by three base station antennas, the RF lens would be designed to narrow the azimuth HPBW of each antenna beam to about 33°.

SUMMARY

Pursuant to embodiments of the present invention, base station antennas are provided that include a plurality of multiplexer filters. Each multiplexer filter includes a first port that is configured to pass RF signals in a first frequency band but not RF signals in a second frequency band, a second port that is configured to pass RF signals in the second frequency band but not RF signals in the first frequency band, and a third port that is configured to pass RF signals in both the first and second frequency bands. These base station antennas further include a multi-column array of radiating elements that includes a plurality of sub-arrays, each sub-array including one or more of the radiating elements, and each sub-array coupled to the third port of a respective one of the multiplexer filters. The base station antennas also include a plurality of first frequency band ports and a plurality of second frequency band ports, each first frequency band port coupled to the first ports of respective subsets of the multiplexer filters and each second frequency band port coupled to the second ports of at least some of the multiplexer filters. The array of radiating elements is configured to operate as an N×MIMO sector antenna in the first frequency band and as a sector-splitting antenna that generates at least two antenna beams that point in different directions in the second frequency band, where N is an integer greater than or equal to 2.

In some embodiments, the base station antenna may further include a plurality of beam-forming networks that are coupled between the second frequency band ports and the radiating elements.

In some embodiments, the multi-column array may have a plurality of rows that each include a total of X radiating elements and at least one row that includes a total of Y radiating elements, where Y is less than X.

In some embodiments, the base station antenna may further include a plurality of power dividers that are coupled between the first frequency band ports and the radiating elements, where at least some of the power dividers have a first output that is coupled to a sub-array of radiating elements in a first column of the multi-column array and a second output that is coupled to a sub-array of radiating elements in a second, different column of the multi-column array.

In some embodiments, the base station antenna may further include a plurality of first frequency band phase shifters, each first frequency band phase shifter electrically coupled between a respective one of the first frequency band ports and a respective subset of the radiating elements.

In some embodiments, each first frequency band phase shifter may be electrically coupled between a respective one of the first frequency band ports and a respective subset of the power dividers.

In some embodiments, the power dividers may be unequal power dividers.

In some embodiments, each power divider may be electrically coupled between a respective one of the first frequency band ports and a respective subset of the first frequency band phase shifters.

In some embodiments, the base station antenna may further include a plurality of second frequency band phase shifters, each second frequency band phase shifter coupled between the a respective one of the second frequency band ports and a respective subset of the radiating elements.

In some embodiments, each second frequency band phase shifter may be electrically coupled between a respective one of the second frequency band ports and at least some of the beam-forming networks.

In some embodiments, each beam-forming network may include a Butler Matrix.

In some embodiments, the multi-column array may include an even number of rows that have a total of Y radiating elements. In some embodiments, X=4 and Y=3 and N is greater than or equal to 4.

In some embodiments, at least some of the radiating elements included in rows that have Y radiating elements may not be vertically-aligned with columns defined by the radiating elements included in rows that have X radiating elements.

Pursuant to further embodiments of the present invention, antennas are provided that include first and second low-band ports and first and second high-band ports, along with a plurality of multiplexing filters. These antennas further include an array of radiating elements that includes a plurality of sub-arrays, each sub-array including one or more of the radiating elements, and each sub-array coupled to a respective one of the multiplexing filters. A first power divider network is electrically coupled between the first low-band port and a first subset of the plurality of multiplexer filters, and a second power divider network is electrically coupled between the second low-band port and a second subset of the plurality of multiplexer filters. The antennas further include a beam-forming network that is electrically coupled between the first and second high-band ports and the plurality of multiplexer filters. The antenna is configured to operate as a MIMO sector antenna in one of the low-band and the high-band and to operate as a sector-splitting antenna in the other of the low-band and the high-band, and a total number of low-band ports included in the antenna is the same as a total number of high-band ports.

In some embodiments, the array may include a plurality of columns of radiating elements, and the first low-band port may be coupled to radiating elements in at least two different columns of the array.

In some embodiments, the array may include a plurality of columns of radiating elements, and the first power divider network may include an unequal power divider that is configured to output RF signals having different power levels to radiating elements in two different columns of the array.

In some embodiments, an azimuth half power beam width for an antenna beam generated by an RF signal input at the first low-band port may be about twice an azimuth half power beam width for an antenna beam generated by an RF signal input at the first high-band port.

In some embodiments, the array may include a plurality of rows of radiating elements, and some of the rows may have fewer radiating elements than other of the rows.

In some embodiments, at least one of the rows that has fewer radiating elements may be one of a top row of the array or a bottom row of the array.

In some embodiments, an RF signal input at the first low-band port may generate an antenna beam that is suitable for providing coverage to as 120 degree sector in the azimuth plane, and an RF signal input at the first high-band port may generate an antenna beam that is suitable for providing coverage to as 60 degree sector in the azimuth plane.

In some embodiments, the array may include a plurality of columns of radiating elements, and a distance between adjacent columns may be between 0.4-0.75 wavelengths of a center frequency of the high-band.

In some embodiments, the array may include a plurality of columns of radiating elements, and a feed network that connects the first low-band port to the array may include at least one phase shifter and a first power divider that has outputs coupled to respective radiating elements that are in different columns of the array. In some embodiments, the at least one phase shifter may be electrically coupled between the first low-band port and the first power divider. In some embodiments, the first power divider may be electrically coupled between the first low-band port and the at least one phase shifter.

In some embodiments, a feed network that connects the first high-band port to the array may include at least one phase shifter and a first beam-forming network. In some embodiments, the first beam-forming network may be electrically coupled between the first high-band port and the at least one phase shifter. In some embodiments, the at least one phase shifter may be electrically coupled between the first high-band port and the first beam-forming network. In some embodiments, the first beam-forming network may include at least one 2×3 beam-forming network and at least one 2×4 beam-forming network.

Pursuant to still further embodiments of the present invention, antennas are provided that include first and second low-band ports and first and second high-band ports, a plurality of multiplexing filters, and an array of radiating elements that includes a plurality of sub-arrays, each sub-array including one or more of the radiating elements, and each sub-array coupled to a respective one of the multiplexing filters. These antennas further include a first low-band feed network electrically coupled between the first low-band port and at least some of the plurality of multiplexing filters, and a first high-band feed network electrically coupled between the first high-band port and at least some of the plurality of multiplexing filters. The array of radiating elements has a plurality of rows that each include a total of X radiating elements and at least one row that includes a total of Y radiating elements, where Y is less than X.

In some embodiments, the first low-band feed network includes a first power divider network and the first high-band feed network includes a beam-forming network.

In some embodiments, the rows of radiating elements in the array that include a total of X radiating elements define a plurality of columns.

In some embodiments, the first power divider is coupled to radiating elements are in at least two different columns.

In some embodiments, the first power divider is an unequal power divider that does not equally divide power input thereto.

In some embodiments, the antenna is configured so that a low-band RF signal input at the first low-band port generates an antenna beam that is suitable for providing coverage to as 120° sector in the azimuth plane, and so that a high-band RF signal input at the first high-band port generates an antenna beam that is suitable for providing coverage to a predefined subset of the 120° sector in the azimuth plane.

In some embodiments, the predefined subset of the 120° sector in the azimuth plane is half of the 120° sector in the azimuth plane.

In some embodiments, at least one of the rows that has Y radiating elements is one of a top row of the array or a bottom row of the array.

In some embodiments, the first high-band feed network may include a first power divider network and the first low-band feed network may include a beam-forming network.

DETAILED DESCRIPTION

Figure 1:
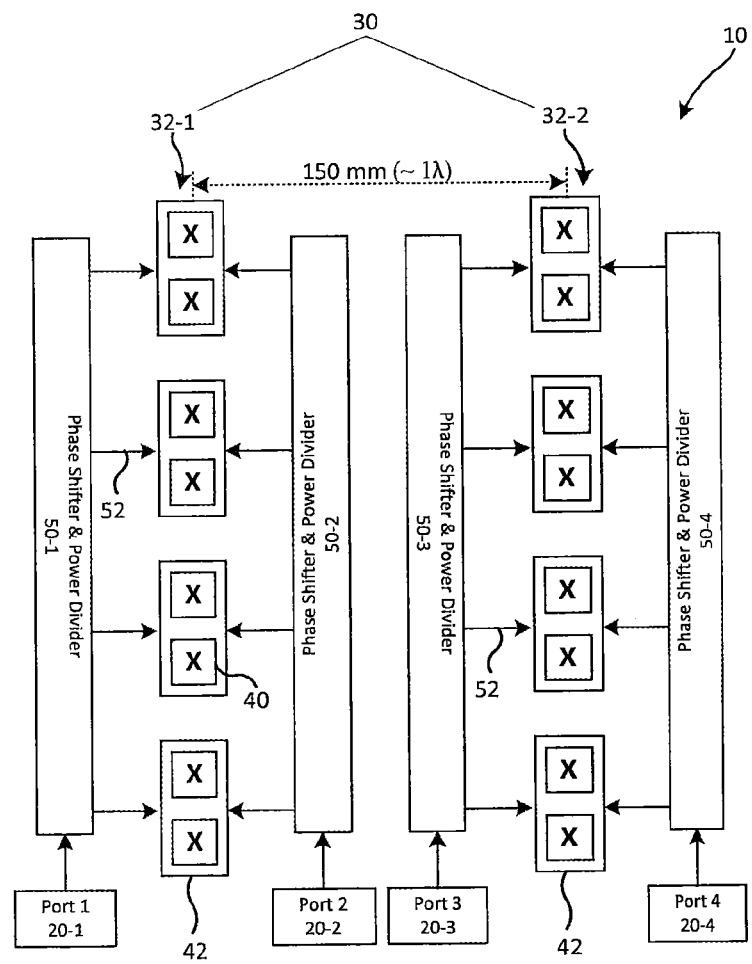
FIG. 1 is a schematic block diagram of a conventional four column, cross-polarized base station antenna that may be operated as a 4×MIMO antenna.

Pursuant to embodiments of the present invention, multiplexed base station antennas are provided that have a multi-column array of wideband radiating elements. The array of wideband radiating elements may operate as a MIMO sector antenna in a first frequency band and as a multi-beam sector-splitting antenna in a second frequency band. The multiplexed base station antennas according to embodiments of the present invention may allow cellular operators to provide service for two different frequency bands using a single array of wideband radiating elements even though different wireless communications standards are used for the two different frequency bands.

In an example embodiment, a base station antenna may be provided that includes a four-column array of cross-polarized wideband radiating elements. The antenna may include four ports for a first frequency band that are coupled to the array and another four ports for a second frequency band that are coupled to the array. The second frequency band may be at higher frequencies than the first frequency band. For example, the second frequency band may be the 2300-2690 MHz frequency band or a portion thereof, and the first frequency band may be the 1695-2180 MHz frequency band or a portion thereof. Diplexers are provided for each radiating element (or for sub-arrays of radiating elements) so that RF signals in both frequency bands may be transmitted through the four-column array.

The four-column array may be operated as a 4×MIMO sector antenna in the first frequency band (i.e., the antenna generates two antenna beams with approximately 65° azimuth HPBW at each of two orthogonal polarizations) and as a sector-splitting antenna in the second frequency band (i.e., the antenna generates two antenna beams with approximately 33° azimuth HPBW that point at different azimuth angles at each of two orthogonal polarizations). In the first frequency band, each port may be coupled to two of the four columns of the array in order to narrow the azimuth beam width of the first frequency band antenna beams. In the second frequency band, each port may be coupled to all of the radiating elements of the array. The four columns may be spaced apart from each other by a distance that is selected so that the peaks of the sector-splitting beams will point at azimuth angles that are approximately 25°-33° from the azimuth boresight pointing angle of the four-column array. In an example embodiment, the columns may be spaced apart from each other by a distance that is approximately 0.4λ to 0.75λ at the center frequency of the second frequency band. The second frequency band (where sector-splitting is performed) may be at higher frequencies than the first frequency band in some embodiments, while the second frequency band may be at lower frequencies than the first frequency band in some embodiments.

In some embodiments, one or more unequal power dividers may be used in the first frequency band to couple each port to two of the four columns of radiating elements. The use of unequal power dividers may reduce the extent to which the use of two columns narrows the azimuth beamwidth in the first frequency band so that an appropriate azimuth beam width may be achieved.

In some embodiments, the four column array (i.e., an array that has a plurality of rows that each have four radiating elements, where the radiating elements in each row are aligned along a vertical axis with the radiating elements in the other rows to form an X-row, 4-column array) may further include additional rows of radiating elements that only have three radiating elements per row. In such embodiments, the radiating elements in the rows that only have three radiating elements may not be aligned along vertical axes with the radiating elements in the rows that include four radiating elements, but instead will be positioned between adjacent of the vertical axes. As a result, each first frequency band port may be coupled to two radiating elements in some rows of the array and to only a single radiating element in other rows of the array. The effect of including rows that only have three radiating elements may be to increase the azimuth beam width for the antenna beams in the first frequency band. Providing an array having rows with different numbers of radiating elements may be used as an alternative to the above-described unequal power division techniques, or may be used in conjunction with the unequal power division techniques to further increase the azimuth beam width of the lower frequency band antenna beams.

Thus, pursuant to some aspects of the present invention, base station antennas are provided that include a plurality of multiplexer filters. Each multiplexer filter may have a first port that is configured to pass RF signals in a first frequency band but not RF signals in a second frequency band, a second port that is configured to pass RF signals in the second frequency band but not RF signals in the first frequency band, and a third port that is configured to pass RF signals in both the first and second frequency bands. These antenna further include a multi-column array of radiating elements that includes a plurality of sub-arrays, where each sub-array is coupled to the third port of a respective one of the multiplexer filters. Each sub-array may include one or more radiating elements. These antennas also include a plurality of first frequency band ports that are coupled to the first ports of respective subsets of the multiplexer filters and a plurality of second frequency band ports that are coupled to the second ports of at least some of the multiplexer filters. The array of radiating elements may be configured to operate as a MIMO sector antenna in the first frequency band and as a sector-splitting antenna in the second frequency band that generates at least two antenna beams that point in different directions. In some embodiments, the multi-column array may have a plurality of rows that each include a total of X radiating elements and at least one row that includes a total of Y radiating elements, where Y is less than X. In some embodiments, Y may be greater than or equal to 2.

According to further aspects of the present invention, base station antennas are provided that include first and second low-band ports, first and second high-band ports, a plurality of multiplexing filters, an array of radiating elements that includes a plurality of sub-arrays that are coupled to respective ones of the multiplexing filters, a first power divider that is network electrically coupled between the first low-band port and a first subset of the plurality of multiplexer filters, a second power divider network that is electrically coupled between the second low-band port and a second subset of the plurality of multiplexer filters and a beam-forming network that is electrically coupled between the first and second high-band ports and the plurality of multiplexer filters. In some embodiments, the array of radiating elements may have a plurality of rows that each include a total of X radiating elements and at least one row that includes a total of Y radiating elements, where Y is less than X.

According to still further aspects of the present invention, base station antennas are provided that include first and second low-band ports, first and second high-band ports, a plurality of multiplexing filters, and an array of radiating elements that includes a plurality of sub-arrays that are coupled to respective ones of the multiplexing filters. These antenna further include a first low-band feed network electrically coupled between the first low-band port and at least some of the plurality of multiplexing filters and a first high-band feed network electrically coupled between the first high-band port and at least some of the plurality of multiplexing filters. The array of radiating elements has a plurality of rows that each include a total of X radiating elements and at least one row that includes a total of Y radiating elements, where Y is less than X.

Embodiments of the present invention will now be discussed in greater detail with reference to the accompanying figures.

The use of a single array of radiating elements to provide service in multiple frequency bands is known in the art. For example, by using wideband radiating elements and placing multiplexer filters (e.g. diplexers, triplexers, etc.) between the array of radiating elements and the rest of the feed network, multiple frequency-specific feed networks may be attached to the same array of radiating elements, as is disclosed in U.S. patent application Ser. No. 13/771,474, filed Feb. 20, 2013. This sharing of radiating elements allows a single column of radiating elements to generate antenna beams with independent elevation down tilts for two or more different frequency bands. This concept may, in principle, be extended to antennas with multiple columns of radiating elements. However, in practice, it may be difficult to use a multi-column array of wideband radiating elements to provide service in two different frequency bands, particularly if the frequency bands are spaced rather far apart, because the configuration for the radiating elements that will be optimal for one frequency band is often far from optimal for the other frequency band.

For example, one widely-practiced wireless communication standard is LTE. The LTE standard supports both Frequency Division Duplexing (FDD-LTE) and Time Division Duplexing (TDD-LTE) technologies in different sub-bands. For example the 2490-2690 MHz band is licensed world-wide for TDD-LTE, while various bands in the 1690-2170 MHz range are used for FDD-LTE applications.

Many TDD-LTE networks make use of multi-column beamforming antennas. An antenna optimized for TDD-LTE may include, for example, four columns of cross-polarized radiating element that are spaced 0.5-0.65 wavelengths apart and each generating a nominal azimuth HPBW of about 65° to 90° in the 2490-2690 MHz band. The four columns of radiating elements may be operated as a beam-forming antenna, and the dual polarization may be used to implement 2×MIMO. In contrast, in the 1690-2170 MHz band (or portion thereof), two-column arrays of cross-polarized radiating elements that have a nominal 45°-65° azimuth HPBW and a column spacing of at least about one wavelength are commonly used to implement 4×MIMO. Thus, if the number of columns and column spacing are optimized for one sub-band of LTE, the number of columns and/or the column spacing will typically not be optimized for the other sub-bands of LTE. As such, two separate antennas would typically be used to implement the beam-forming antenna with 2×MIMO in the 2490-2690 MHz band (also referred to herein as the 2600 MHz band) and to implement the 4×1 MIMO in the 1690-2170 MHz band (also referred to herein as the 1900 MHz band).

U.S. Pat. No. 9,722,327, issued Aug. 1, 2017, discloses a technique for using a four column array of wideband radiating elements to provide a beam-forming 2×MIMO antenna in the TDD-LTE 2600 MHz frequency band and a 4×MIMO antenna in the FDD-LTE 1900 MHz sub-band. This technique uses unequal power dividers to couple each 1900 MHz port to two of the four columns while providing the appropriate azimuth beam width for the 1900 MHz antenna beams.

It has been realized that in some applications, performance may be improved if a multi-column array of wideband radiating elements is used to implement a MIMO antenna in a first frequency band and a sector-splitting antenna in a second frequency band.

FIG. 1 is a schematic block diagram of a conventional base station antenna 10 that includes two columns of cross-polarized radiating elements that may be operated as a 4×MIMO antenna in all or part of the 1690-2170 MHz frequency band. The antenna 100 includes four ports, 20-1 through 20-4, and an array 30 of cross-polarized radiating elements 40 that includes two columns 32 of radiating elements 40 where the columns 32 are spaced apart by, for example, at least about one wavelength (which is about 150 mm at the center frequency of the 1690-2170 MHz frequency band). Herein, when an antenna includes two or more like elements, the elements may be given a two-part reference numeral, and the like elements may be referred to individually by their full reference numbers (e.g., port 20-1) and collectively by only the first part of their reference number (e.g., ports 20). Each column 32 of radiating elements 40 generates an antenna beam having a nominal azimuth HPBW of about 65° to 90° in the 1690-2170 MHz frequency band. Each column 32 has an associated feed network that includes an adjustable phase shifter and power divider circuit 50. Each adjustable phase shifter and power divider circuit 50 couples a respective one of the input ports 20 to the individual radiating elements 40 of a respective column 32. The adjustable phase shifter and power divider circuit 50 may include multiple outputs 52, and each output 52 may be coupled to an individual one of the radiating elements 40 in the associated column or to a sub array 42 of one or more of the radiating elements 40 (in the depicted embodiment each output 52 is coupled to a respective sub-array 42, where each sub-array 42 includes two radiating elements 40). Each adjustable phase shifter and power divider circuit 50 splits an RF signal provided by a respective one of the ports 20 into a plurality of sub-components, and varies the relative phasing of these sub-components in order to adjust the elevation or "tilt" angle of the antenna beam formed by the column 32 of radiating elements 40 (i.e., the elevation angle of the boresight pointing direction of the antenna beam).

Figure 2:
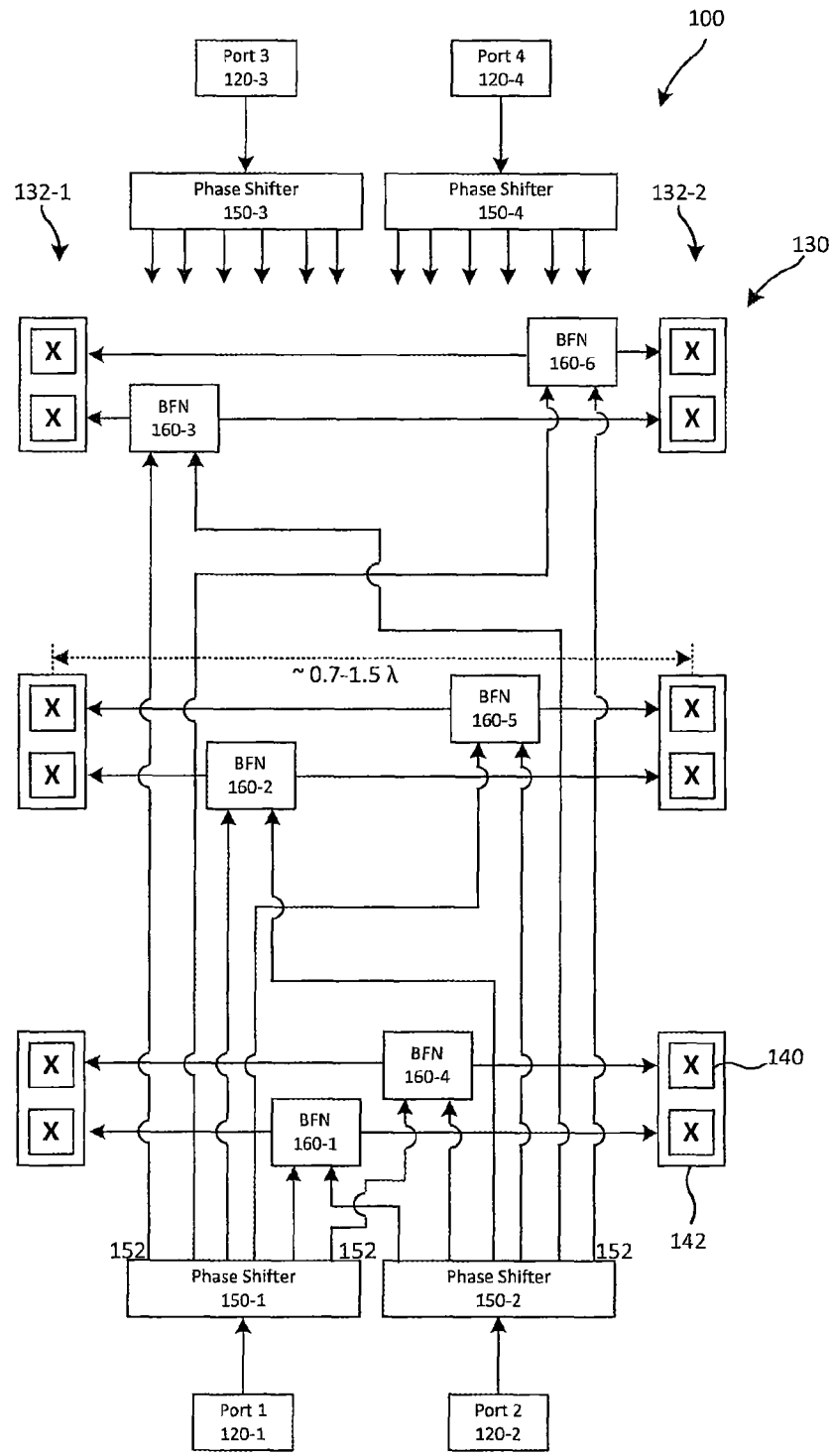
FIG. 2 is a schematic block diagram of a conventional two column, cross-polarized sector-splitting base station antenna.

FIG. 2 is a schematic block diagram of a conventional sector-splitting base station antenna 100 that includes an array 130 of radiating elements 140. The base station antenna 100 includes four ports, 120-1 through 120-4, and the array 130 includes two columns 132 of cross-polarized radiating elements 140 that are spaced apart by about 0.7-1.5 wavelengths. Each port 120 is coupled to a respective adjustable phase shifter and power divider circuit 150. Each adjustable phase shifter and power divider circuit 150 splits an RF signal provided by a respective one of the ports 120 into a plurality of sub-components, and varies the relative phasing of these sub-components in order to adjust the elevation or "tilt" angle of the antenna beam formed by the RF signal. Each adjustable phase shifter and power divider circuit 150 may include multiple outputs 152.

The antenna 100 further includes a plurality of beam-forming networks 160. Each beam-forming network 160 may comprise, for example, a Butler Matrix. Respective outputs 152 from two of the adjustable phase shifter and power divider circuits 150 are coupled to each beam-forming network 160 in a first subset of the beam-forming networks 160. For example, as shown in FIG. 2, each beam-forming network 160-1 through 160-6 receives a sub-component of the RF signal input to the antenna 100 at port 120-1 and a sub-component of the RF signal input to the antenna 100 at port 120-2 that are output by adjustable phase shifter and power divider circuits 150-1 and 150-2. Each beam-forming network 160-1 through 160-6 has a pair of outputs, with the first output connected to a respective sub-array 142 of at least one radiating element 140 in the first column 132-1, and the second output connected to a respective sub-array 142 of at least one radiating element 140 in the second column 132-2. The beam-forming networks 160-1 through 160-6 generate a pair of antenna beams that each have an azimuth HPBW of about 33° in the 2490-2690 MHz band. The two antenna beams may have azimuth boresight angles of about −30° and 30°, respectively (i.e., the antenna beams are electronically steered off boresight by the beam-forming networks).

Figure 3A:
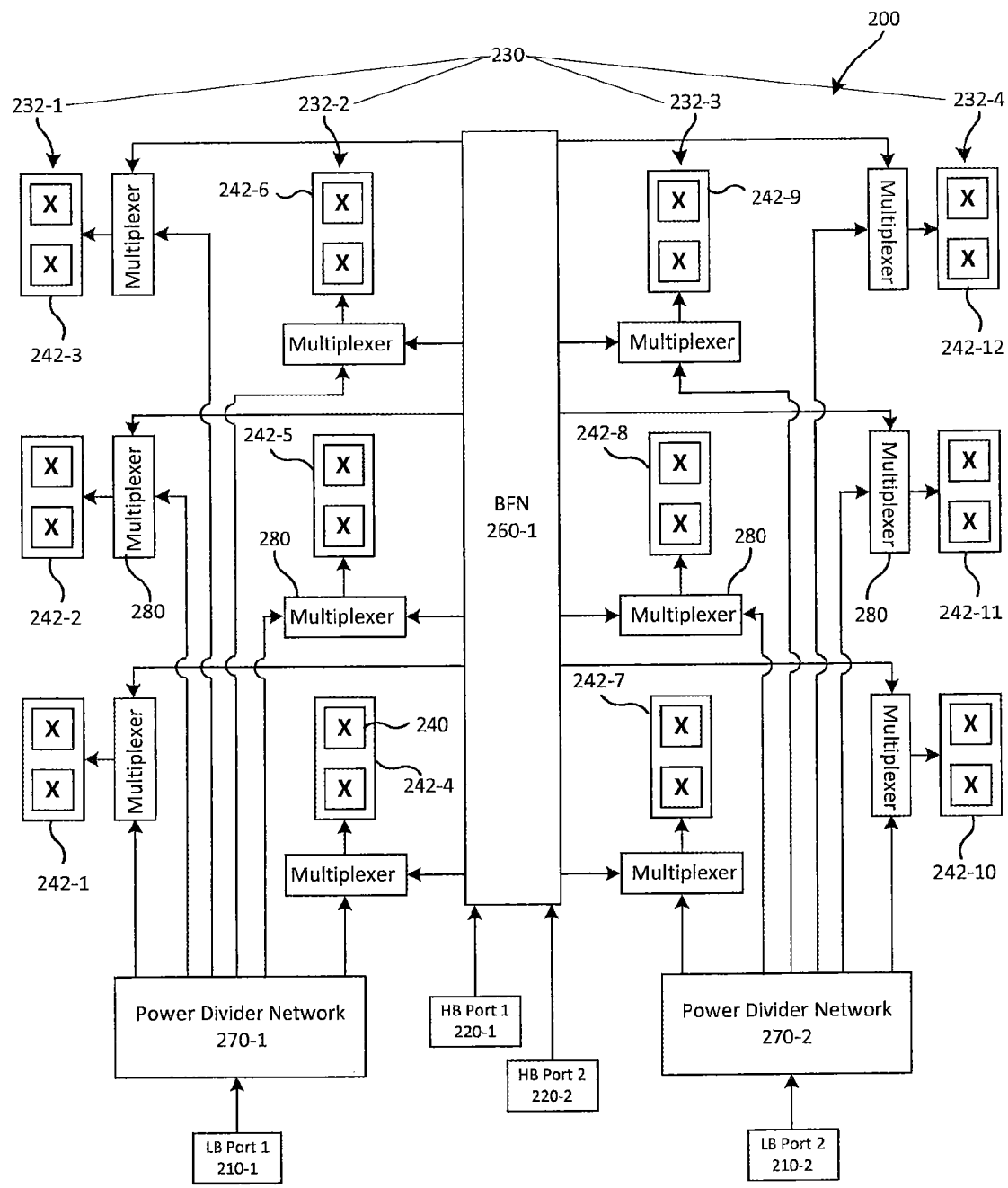
FIG. 3A is a schematic block diagram illustrating a base station antenna according to embodiments of the present invention that includes an array of wideband radiating elements that operates as a MIMO sector antenna in a first frequency band and as a sector-splitting antenna in a second frequency band.

Respective outputs 152 from adjustable phase shifter and power divider circuits 150-3 and 150-4 are coupled to each beam-forming network 160 in a second subset of the beam-forming networks 160. In order to simplify the drawing, the second subset of beam-forming networks 160 that are associated with phase shifters 150-3 and 150-4 are omitted from FIG. 2. The connections between phase shifters 150-3 and 150-4 and the omitted beam-forming networks 160 are identical to the connections between phase shifters 150-1 and 150-2 and beam-forming networks 160-1 through 160-6, and the omitted beam-forming networks connect to the sub-arrays 142 in the same manner shown as 160-1 through 160-6, except that beam-forming networks 160-1 through 160-6 connect to the −45° slant radiators of the radiating elements 140, while the omitted beam-forming networks 160 connect to the +45° slant radiators of the radiating elements 140. The beam-forming networks 160 that are omitted from FIG. 2 generate a second pair of antenna beams that each have an azimuth HPBW of about 33° in the 2490-2690 MHz band. The two antenna beams may have azimuth boresight angles of about −30° and 30°, respectively FIG. 3A is a schematic block diagram illustrating a base station antenna 200 according to embodiments of the present invention that includes an array 230 of wideband radiating elements 240 that operates as a MIMO sector antenna in a first frequency band and as a sector-splitting antenna in a second frequency band. As shown in FIG. 3A, the base station antenna 200 includes a plurality of first frequency band ports 210 (referred to as low-band or "LB" ports in FIG. 3A to signify that the ports 210 may receive signals in the lower of two frequency bands) and a plurality of second frequency band ports 220 (referred to as high-band or "HB" ports in FIG. 3A to signify that the ports 220 may receive signals in the higher of two frequency bands). The array 230 of wideband radiating elements 240 includes a plurality of columns 232 of radiating elements 240, and the radiating elements 240 may be arranged in sub-arrays 242, with each sub-array 242 including one or more radiating elements 240.

Each first frequency band port 210 may be coupled to a respective subset of the sub-arrays 242 through a respective power divider network 270. In some embodiments, each power divider network 270 may be configured to equally split RF signals that are input thereto. In other embodiments, each power divider network 270 may be configured to unequally split RF signals that are input thereto. For example, an RF signal that is to be transmitted by the antenna 200 may be input at first frequency band port 210-1. The RF signal may be split by the associated power divider network 270 into a plurality of sub-components. Half of the sub-components are passed to sub-arrays 242 (through respective multiplexing filters 280) that are in a first of the columns 232-1, and the other half of the sub-components are passed to sub-arrays 242 (again through respective multiplexing filters 280) that are in a second of the columns 232-2. In embodiments where unequal power division is implemented, the sub-components of the RF signal that are passed to one of the columns 230 may have higher power levels than the sub-components of the RF signal that are passed to the other of the columns 232. Typically, the sub-components of the RF signal that are passed to an interior column 232 of the array 230 will receive the higher power sub-components (i.e., column 232-2 in the example embodiment of FIG. 3A). By adjusting the relative magnitudes of the higher power sub-components of the RF signal and the lower power sub-components of the RF signal, the azimuth beam width of antenna beams generated by RF signals input to the first frequency band port 210-1 may be adjusted. In particular, the greater the difference in the relative power levels, the larger the azimuth beam width. The azimuth beam width of each low-band antenna beam may be, for example, designed to be a suitable beam width for covering a sector. For example, each low-band antenna beam may have an azimuth HPBW of about 65° in some embodiments.

The first frequency band port 210-2 may be coupled to a second sub-set of the sub-arrays 242 in the exact same manner as first frequency band port 210-1, and therefore further description of the connections between first frequency band port 210-2 and the radiating elements 240 will be omitted.

Each second frequency band port 220 may be coupled to a subset of the sub-arrays 242 through a beam-forming network 260. As shown in FIG. 3A, both second frequency band ports 220 are coupled to the beam-forming network 260, and each output of the beam-forming network 260 is coupled to a respective one of the sub-arrays 242 (through a respective multiplexer filter 280). The beam-forming network 260 may generate first and second antenna beams based on the RF signals input to high-band ports 220-1 and 220-2, respectively. The first and second antenna beams may be electronically scanned in the azimuth plane to point in opposite directions from the boresight pointing direction of the array 230.

A plurality of multiplexer filters 280 are provided, with one multiplexer filter 280 provided per sub-array 242. Each multiplexer filter 280 includes a first input that is coupled to one of the power divider networks 270, a second input that is coupled to the beam-forming network 260, and an output that is coupled to a respective one of the sub-arrays 242. The multiplexer filters 280 may combine RF signals received from the power divider network 270 and pass the combined signal to an associated sub-array 242 for transmission by the radiating elements 240 thereof, and may split RF signals that are received from the radiating elements 240 of the associated sub-array 242 so that RF signals in the first frequency band are passed to the power divider networks 270 and RF signals in the second frequency band are passed to the beam-forming network 260.

FIG. 3A (standing alone) illustrates an embodiment where the base station antenna is implemented with single-polarized radiating elements. As known to those of skill in the art, most modern base station antennas are now implemented using cross-polarized radiating elements that each include two separate radiators that are configured to radiate RF energy at orthogonal polarizations. One widely used cross-polarized radiating element is the −45°/+45° slant dipole radiating element that includes a first dipole radiator that is oriented at an angle of −45° with respect to the horizon, and a second dipole radiator that is oriented at an angle of +45° with respect to the horizon.

Figure 3B:
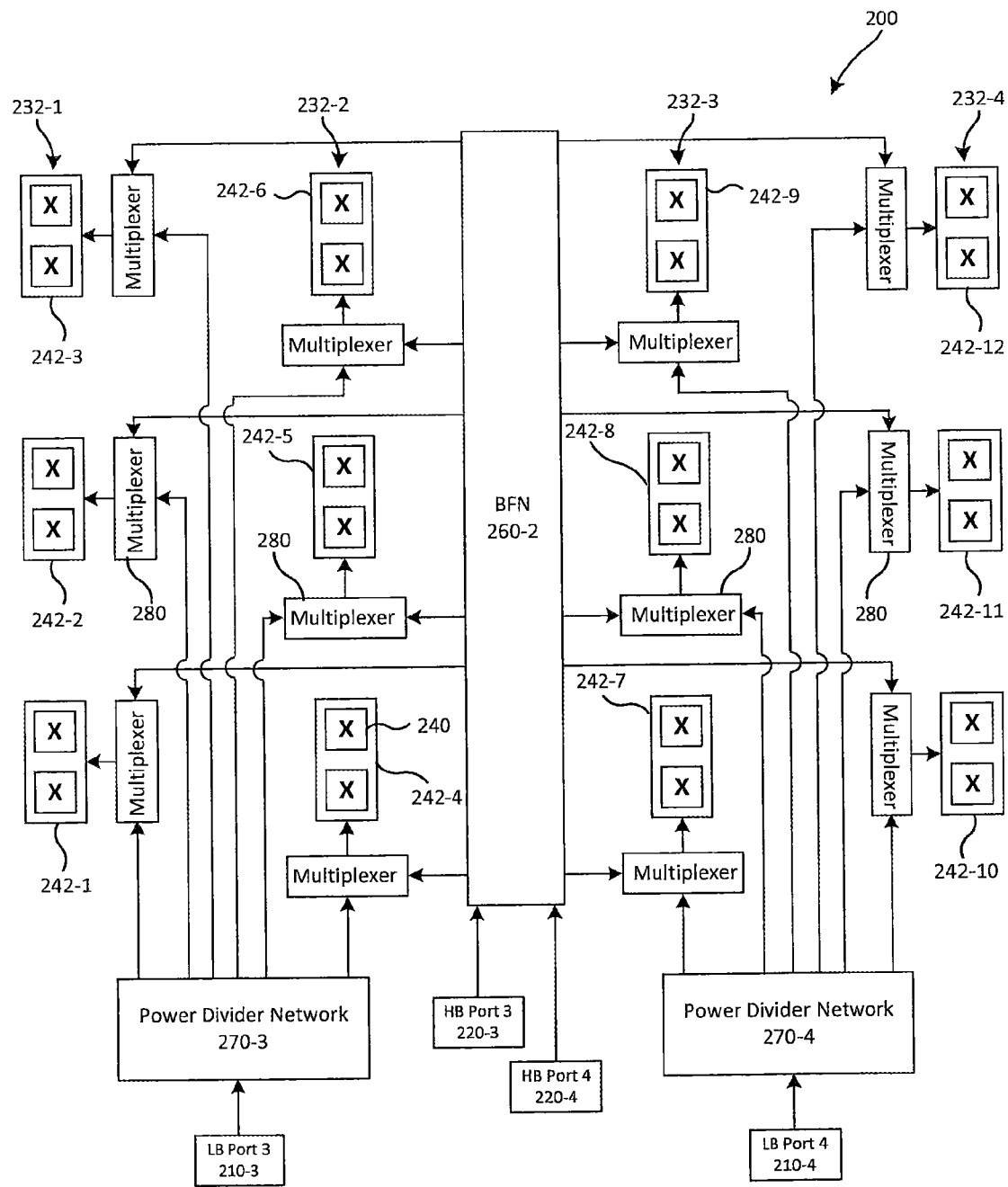
FIG. 3B is a schematic block diagram illustrating additional components that can be included in the base station antenna of FIG. 3A if the base station antenna is implemented as a dual-polarized antenna.

FIG. 3B is a schematic block diagram illustrating additional components that would be included in the base station antenna 200 of FIG. 3A if the base station antenna 200 is implemented as a dual-polarized antenna. As shown in FIG. 3B, to implement base station antenna 200 as a dual-polarized antenna, the RF ports 210, 220, power divider networks 270, multiplexer filters 280 and beam-forming network 260 that are shown in FIG. 3A are duplicated for the second polarization. The RF ports 210, 220, power divider networks 270, multiplexer filters 280 and beam-forming network 260 that are shown in FIG. 3A may, for example, be used to feed the −45° radiators of each cross-polarized radiating element 240, and the RF ports 210, 220, power divider networks 270, multiplexer filters 280 and beam-forming network 260 that are shown in FIG. 3B may be used to feed the +45° radiators of each cross-polarized radiating element 240. It should be noted that the same sub-arrays 242 of radiating elements 240 are shown in both FIGS. 3A and 3B.

As the embodiments of the present invention that are discussed below are relatively complex, the figures depicting these embodiments only illustrate the ports and feed networks for one of the two polarizations in order to simplify the drawings (i.e., the figures correspond to FIG. 3A). It will be appreciated that a figure corresponding to FIG. 3B may be generated for each such embodiment to show the ports and feed networks for the second polarization.

The cross-polarized version of antenna 200 may operate as follows. A total of four first frequency band ports 210-1 through 210-4 are included in antenna 200. The RF signals input to each of these ports 210 may generate a separate antenna beam, so that a total of four antenna beams may be simultaneously formed for the first frequency band (the low-band). Each first frequency band antenna beam may have an azimuth beam width that is suitable for covering, for example, a 120° sector. These four antenna beams may be used to operate the antenna in a 4×MIMO configuration as a sector antenna. A total of four second frequency band ports 220 are likewise included in antenna 200. These four ports 220 may be used to split a 120° sector into two 60° sub-sectors. Two of the ports (ports 220-1 and 220-2) may generate antenna beams in the second frequency band (the high-band) at slant −45° and slant +45° polarizations that point at a boresight azimuth angle of about −30° and the other two ports (ports 220-3 and 220-4) may generate antenna beams in the second frequency band at slant −45° and slant +45° polarizations that point at a boresight azimuth angle of about 30° so that the 120° sector is split into two sub-sectors. Since two high-band antenna beams are provided for each 60° sub-sector, the antenna 200 may operate as a 2×MIMO antenna in the high-band.

Figure 4:
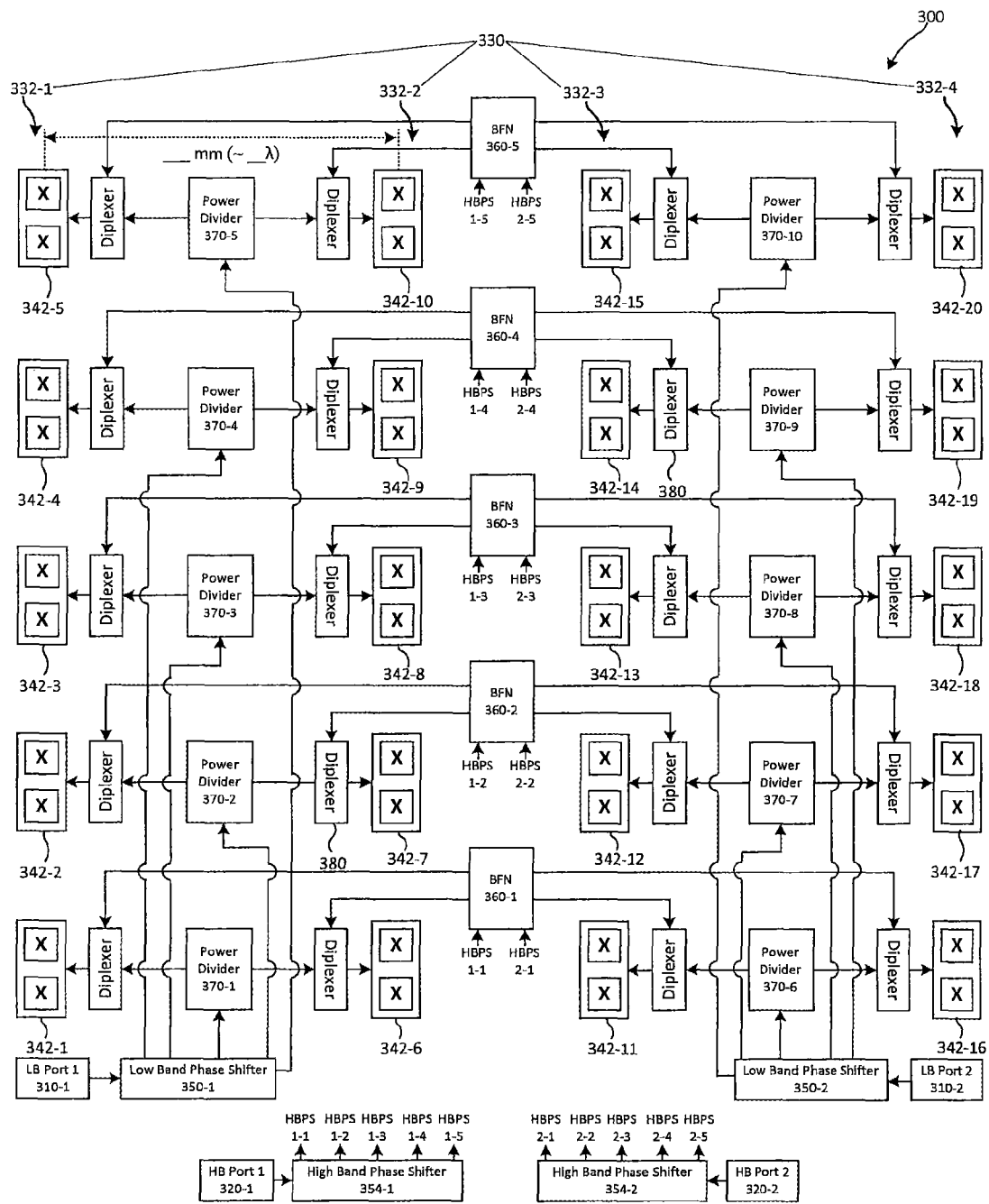
FIG. 4 is a schematic block diagram illustrating a base station antenna according to embodiments of the present invention.

FIG. 4 is a schematic block diagram illustrating a base station antenna 300 according to embodiments of the present invention. FIG. 4 illustrates a specific implementation of one example embodiment of the antenna 300 of FIGS. 3A-3B. As noted above, FIG. 4 only shows the ports and feed networks for one of the two polarizations to simplify the figure.

As shown in FIG. 4, the base station antenna 300 includes a plurality of first frequency band (low-band) ports 310 and a plurality of second frequency band (high-band) ports 320. Two low-band ports 310 and two high-band ports 320 are provided for each polarization (i.e., the antenna 300 includes a total of four low-band ports 310 and a total of four high-band ports 320). The antenna 300 further includes an array 330 of wideband radiating elements 340. The array 330 includes four columns 332 of radiating elements 340, and the radiating elements 340 may be arranged in sub-arrays 342, with each sub-array 342 including one or more radiating elements 340. While each sub-array 342 includes two radiating elements 340 in the example embodiment of FIG. 4, it will be appreciated that some or all of the sub-arrays 342 may have a single radiating element 340 or may include more than two radiating elements 340, and that all of the sub-arrays 342 need not include the same number of radiating elements 340.

Each first frequency band port 310 may be coupled to a respective adjustable phase shifter and power divider circuit 350. Each adjustable phase shifter and power divider circuit 350 splits an RF signal provided by a respective one of the ports 310 into a plurality of sub-components, and varies the relative phasing of these sub-components in order to adjust the elevation or "tilt" angle of the antenna beam formed by the RF signal. Each adjustable phase shifter and power divider circuit 350 may include multiple outputs, and each output is coupled to a respective one of a plurality of power dividers 370. Each power divider network 370 that is connected to low-band phase shifter 350-1 is coupled to a respective sub-array 342 in the first column 332-1 of radiating elements 340 and to a respective sub-array 342 in the second column 332-2 of radiating elements 340. Each power divider network 370 that is connected to low-band phase shifter 350-2 is coupled to a respective sub-array 342 in the third column 332-3 of radiating elements 340 and to a respective sub-array 342 in the fourth column 332-4 of radiating elements 340.

In some embodiments, each power divider 370 may be configured to equally split RF signals that are input thereto. In other embodiments, each power divider 370 may be configured to unequally split RF signals that are input thereto. When the power dividers 370 perform unequal power division, the higher power sub-components of the RF signal may be passed to the interior columns (i.e., columns 332-2 and 332-3) and the lower power sub-components of the RF signal may be passed to the exterior columns (i.e., columns 332-1 and 332-4 in some embodiments). By adjusting the relative magnitudes of the higher power sub-components of the RF signal and the lower power sub-components of the RF signal, the azimuth beam widths of the antenna beams generated by RF signals input to the low-band ports 310 may be adjusted to a suitable value. For example, the low-band antenna beams may have an azimuth HPBW of about 65° in some embodiments to provide coverage to a full 120° sector.

Each second frequency band port 320 may be coupled to a respective adjustable phase shifter and power divider circuit 354. Each adjustable phase shifter and power divider circuit 354 splits an RF signal provided by a respective one of the ports 320 into a plurality of sub-components, and varies the relative phasing of these sub-components in order to adjust the elevation or "tilt" angle of the antenna beam formed by the RF signal. Each adjustable phase shifter and power divider circuit 354 may include multiple outputs, and each output is coupled to a respective one of a plurality of individual beam-forming networks 360. In particular, each individual beam-forming network 360 includes first and second input ports. The first input port of each individual beam-forming network 360 is coupled to a respective one of the outputs of a first high-band phase shifter 354 that receives first polarization RF signals (e.g., high-band phase shifter 354-1, which is coupled to −45° slant radiators) and the second input port of each beam-forming network 360 is coupled to a respective one of the outputs of a second high-band phase shifter 354 that receives first polarization RF signals (e.g., high-band phase shifter 354-2, which is also coupled to −45° slant radiators).

Each individual beam-forming network 360 includes four outputs. Each output is coupled to a respective one of the sub-arrays 342. Each individual beam-forming network 360 may contribute to first and second antenna beams that are generated based on the RF signals input to high-band ports 320-1 and 320-2, respectively. The first and second antenna beams may be scanned in the azimuth plane to point in opposite directions from the boresight pointing direction of the array 330. The individual beam-forming networks 360 shown in FIG. 4 may together make up the composite beam-forming network 260 shown in FIG. 3A.

Figure 5:
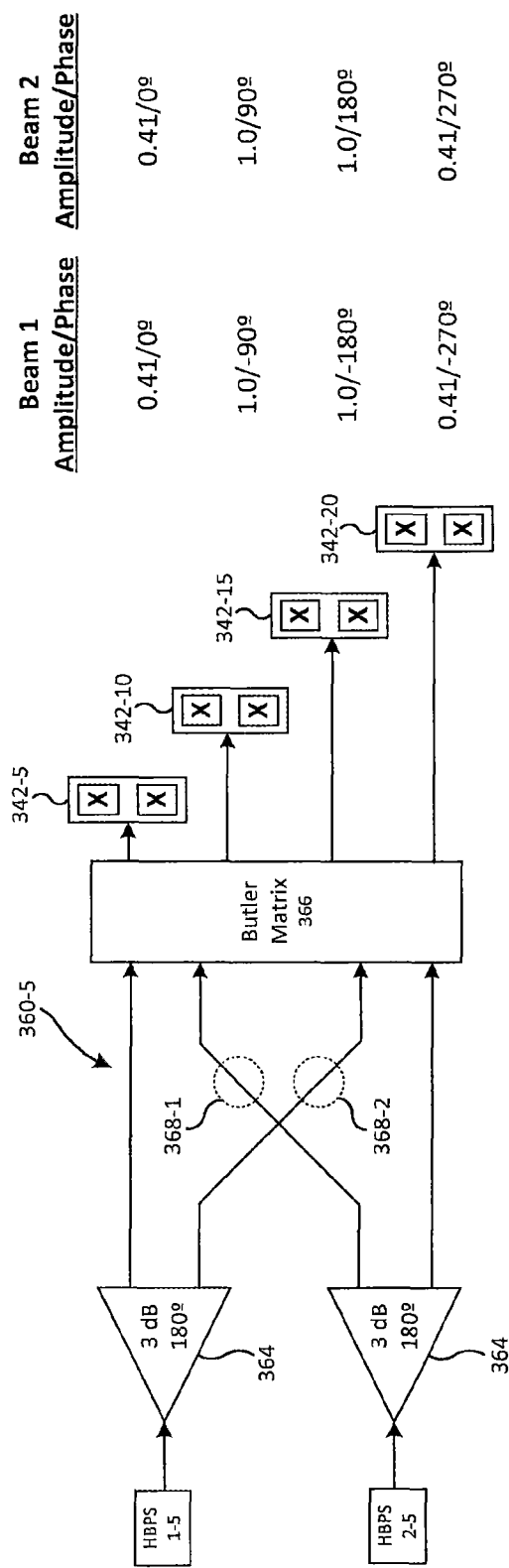
FIG. 5 is a block diagram of a 2×4 beam-forming network that may be used to implement the individual beam-forming networks included in the base station antenna of FIG. 4.

As shown in FIG. 4, an individual beam-forming network 360 is provided for each "row" of sub-arrays 342 included in antenna 300. FIG. 5 is a high level circuit diagram of one possible implementation of individual beam-forming circuit 360-5 that is included in the base station antenna 300 of FIG. 4. The design shown in FIG. 5 may also be used to implement individual bean-forming networks 360-1 through 360-4. By providing five such individual beam-forming networks 360, the elevation HPBW of the two antenna beams may be reduced significantly to a value appropriate for cellular coverage.

As shown in FIG. 5, individual beam-forming network 360-5 may be implemented as a bidirectional 2×4 beam-forming network. The input ports to beam-forming network 360-5 comprise one of the outputs (HBPS 1-5) from the first high-band phase shifter 354-1 and one of the outputs (HBPS 2-5) from the second high-band phase shifter 354-2. These input ports are connected to first and second 180° equal power dividers 364. Each 180° equal power dividers 364 may be implemented, for example, using a Wilkinson power divider with a 180° Shiffman phase shifter. However, other power dividers can alternatively be used, such as rat-race 180° couplers or 90° hybrids with additional phase shift. The outputs of each 180° equal power divider 364 are coupled to a 4×4 Butler Matrix 366. Each output of the Butler Matrix 366 is coupled to a respective one of the sub-arrays 342. The amplitudes and phases at each of the outputs of the Butler Matrix 366 for the RF signals forming the two antenna beams are also shown in FIG. 5. As is shown by the dotted circles 368-1, 368-2, in some embodiments additional phase shifters may be provided between the 180° equal power dividers 364 and the Butler Matrix 366. These extra phase shifters 368 may be used to slightly modify the azimuth HPBW for the antenna beams and/or the azimuth beam pointing angles for cell sector optimization.

Referring again to FIG. 4, a plurality of multiplexer filters 380 are provided in the form of diplexers, with one diplexer 380 provided per sub-array 342. Each diplexer 380 includes a first input that is coupled to a respective one of the power dividers 370, a second input that is coupled to a respective one of the beam-forming networks 360, and an output that is coupled to a respective one of the sub-arrays 342. The diplexers 380 may combine the low-band RF signals received from the respective power dividers 370 with the high-band signals received from the respective individual beam-forming networks 360 and pass the combined signal to a respective one of the sub-arrays 342 for transmission by the radiating elements 340, and may split RF signals that are passed from the radiating elements 340 of the associated sub-array 342 so that the low-band RF signals are passed to the power dividers 370 and the high-band RF signals passed to the individual beam-forming networks 360.

Figure 6:
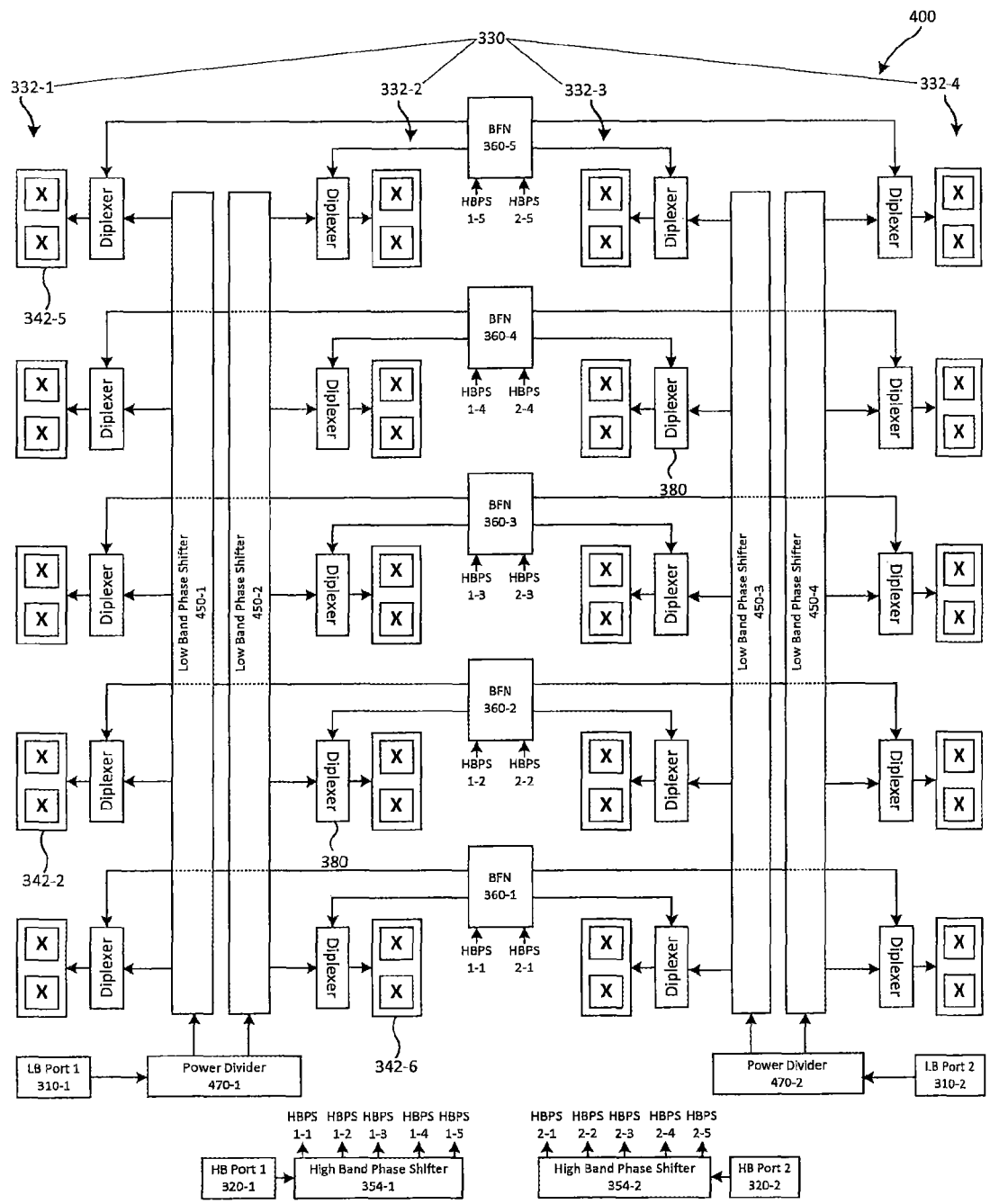
FIG. 6 is a schematic block diagram illustrating a modified version of the base station antenna of FIG. 4.

FIG. 6 is a schematic block diagram illustrating a base station antenna 400 that is a modified version of the base station antenna of FIG. 4. Once again, FIG. 6 only shows the ports and feed networks for one of the two polarizations to simplify the figure. Note that in FIG. 6 dotted lines are used on the connections between the beam-forming networks 360 and the diplexers 380 to show that these are actual connections, which helps simplify the drawing.

As can be seen by comparing FIGS. 4 and 6, the base station antennas 300 and 400 are very similar to one another. In fact, the ports 310, 320, the individual beam-forming networks 360, the diplexers 380, the high-band phase shifters 354 and the array 330 of radiating elements 340 may be identical in the two antennas 300, 400. Accordingly, these components are labeled with the same reference numerals in the two figures and further description of these elements of antenna 400 will be omitted. In addition, it can also be seen that the entire design for the high-band is the same in the two antennas 300, 400. However, the two antennas 300, 400 differ in the design of the low-band feed network and, in particular, in the order in which the phase shifting and power division is performed. In particular, base station antenna 400 is configured to split low-band RF signals that are input at the low-band ports 310 into two sub-components using power dividers 470, and to pass each sub-component to a respective low-band phase shifter 450 that is associated with a particular column 332 of radiating elements 340. This is in contrast to the design of base station antenna 300, where the low-band RF signals that are input at the low-band ports 310 are first split into five sub-components that are variably phase shifted (using low-band phase shifters 350) to apply a desired down tilt to the resulting low-band antenna beams, and then the five outputs of each low-band phase shifter 350 are passed to five power dividers 370 that further split the signals and pass a sub-component to a sub-array 342 in each of two different columns 332. Thus, the order in which the low-band signals are phase shifted and power divided between two columns of radiating elements is reversed in antennas 300 and 400. As in the embodiment of FIG. 4, the power dividers 470 in FIG. 6 may be configured to equally or unequally split RF signals that are input thereto in the same manner as the power dividers 370 of base station antenna 300.

Thus, the primary differences between base station antennas 300 and 400 are that base station antenna 300 (FIG. 4) includes a total of four low-band phase shifters 350 and twenty power dividers 370, while base station antenna 400 (FIG. 6) includes a total of eight low-band phase shifters 450 and four power dividers 470 (note that only half of the phase shifters and power dividers are shown in FIGS. 4 and 6 since the circuit elements are only shown for one polarization). Thus, there is a tradeoff between the two designs in terms of the numbers of phase shifters and power dividers required. In some applications, the design of FIG. 4 may be preferred because it reduces the number phase shifters required, and phase shifters tend to be large units having moving pieces and associated mechanical linkages that can increase the size, weight, cost and complexity of the antenna. While the additional power dividers also have an associated cost, in many cases the power dividers can be implemented on small printed circuit boards (or on existing printed circuit boards) and hence may be more readily and inexpensively implemented.

Figure 7:
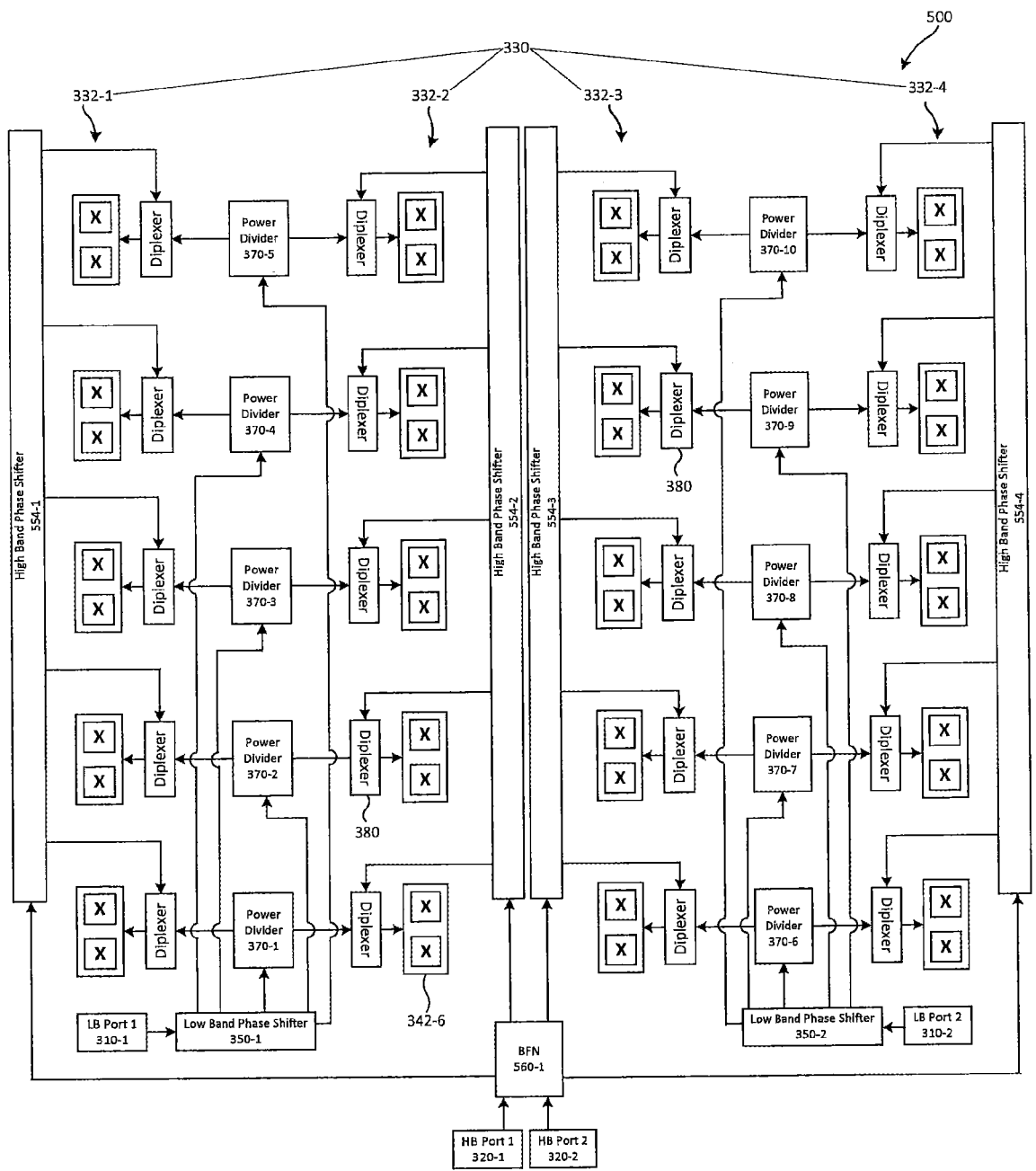
FIG. 7 is a schematic block diagram illustrating another modified version of the base station antenna of FIG. 4.

FIG. 7 is a schematic block diagram illustrating a base station antenna 500 that is another modified version of the base station antenna of FIG. 4. FIG. 7 only shows the ports and feed networks for one of the two polarizations to simplify the figure.

As can be seen by comparing FIGS. 4, 6 and 7, the base station antenna 500 is similar to base station antennas 300 and 400. In fact, the low-band design is identical to the low-band design of base station antenna 300. Accordingly, further description of the low-band feed network of antenna 500 will be omitted here. The high-band design of antenna 500 is similar to the design of antennas 300 and 400, except that in antenna 500, the order in which the phase shifting and beam-forming is performed in the high-band has been reversed from the order in base station antennas 300 and 400. In particular, as shown in FIG. 7, in antenna 500, a pair of high-band ports 320 connect directly to a respective beam-forming network 560. Each beam-forming networks 560 may be implemented as a 2×4 beam-forming network using, for example, the design shown in FIG. 5. The four outputs of each beam-forming network 560 may couple to four respective high-band phase shifters 554. Each phase shifter 554 may split the RF signals input thereto five ways (which split may be into five equal magnitude sub-components or unequal magnitude sub-components) and impart a phase taper to the five sub-components. The five outputs of each phase shifter 554 are connected to the five sub-arrays 342 of a corresponding column 332 of radiating elements 340.

Thus, the primary differences between base station antennas 300 and 500 are that base station antenna 300 (FIG. 4) includes a total of four high-band phase shifters 354 and ten beam-forming networks 360, while base station antenna 500 (FIG. 7) includes a total of eight high-band phase shifters 554 and two beam-forming networks 560 (note that only half of the phase shifters and beam-forming networks are shown in FIGS. 4 and 7 since the circuit elements are only shown for one polarization). Thus, there is a tradeoff between the two designs in terms of the numbers of phase shifters and beam-forming networks required. In some applications, the design of FIG. 4 may be preferred because it reduces the number phase shifters required, and phase shifters tend to be large units having moving pieces and associated mechanical linkages that can increase the size, weight, cost and complexity of the antenna.

Figure 8:
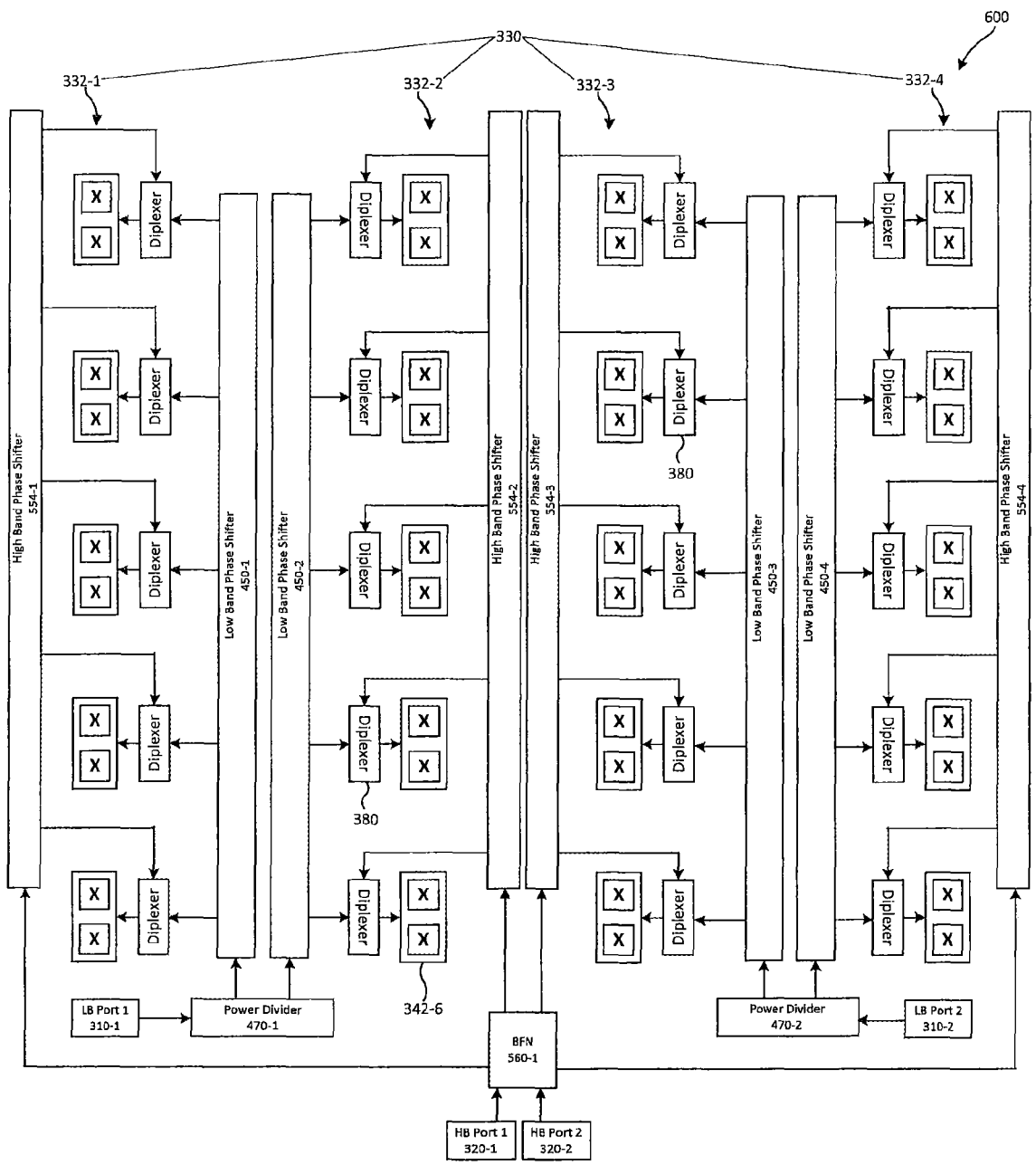
FIG. 8 is a schematic block diagram illustrating yet another modified version of the base station antenna of FIG. 4.

FIG. 8 is a schematic block diagram illustrating a base station antenna 600 that is yet another modified version of the base station antenna of FIG. 4. FIG. 8 only shows the ports and feed networks for one of the two polarizations to simplify the figure.

As can be seen by comparing FIGS. 6-8, the base station antenna 600 has the low-band design of base station antenna 400 and has the high-band design of base station antenna 500. Accordingly, all of the elements of base station antenna 600 have previously been described above and hence further description of the design will be omitted here.

Figure 9A:
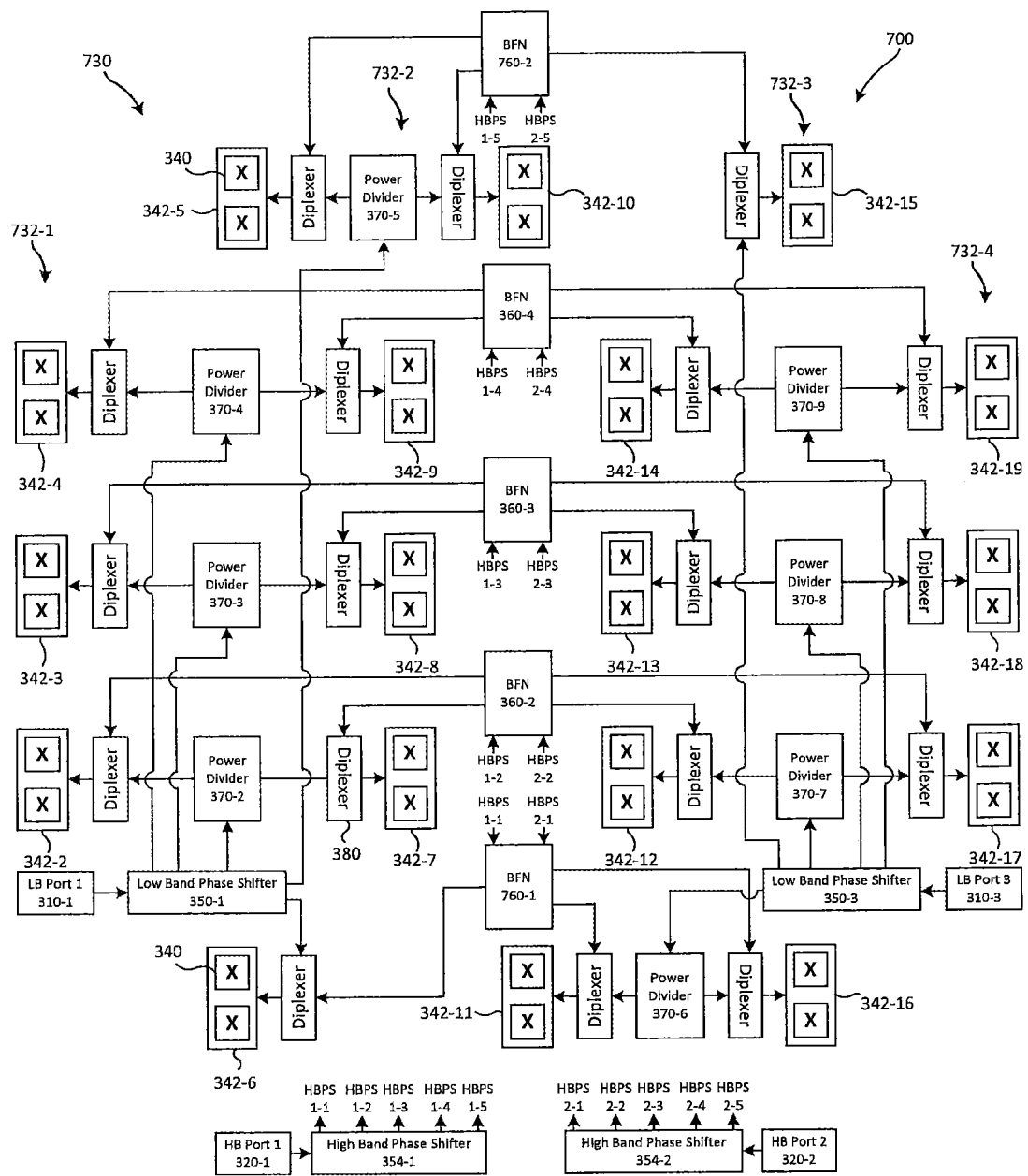
FIG. 9A is a schematic block diagram illustrating a base station antenna according to further embodiments of the present invention.

FIG. 9A is a schematic block diagram illustrating a base station antenna 700 according to still further embodiments of the present invention. The base station antenna is similar to the base station antenna 300 of FIG. 4, except that the array 730 of radiating elements 340 included in base station antenna 700 includes rows that have three radiating elements 340 as well as rows that have four radiating elements 340.

As shown in FIG. 9A, the base station antenna 700 includes an array 730 of radiating elements 340 that has six middle rows of radiating elements 340 that include four radiating elements 340 per row that define four columns 732-1 through 732-4 of radiating elements 340. In addition, the array 730 includes two upper rows of radiating elements 340 that include three radiating elements 340 per row as well as two lower rows of radiating elements 340 that also include three radiating elements 340 per row. The radiating elements 340 in the two upper rows and the two lower rows are positioned between the vertical axes defined by the four columns 732-1 through 732-4, with each row having a first radiating element 340 positioned between columns 732-1 and 732-2, a second radiating element 340 positioned between columns 732-2 and 7320-3, and a third radiating element 340 positioned between columns 732-3 and 732-4.

Figure 9B:
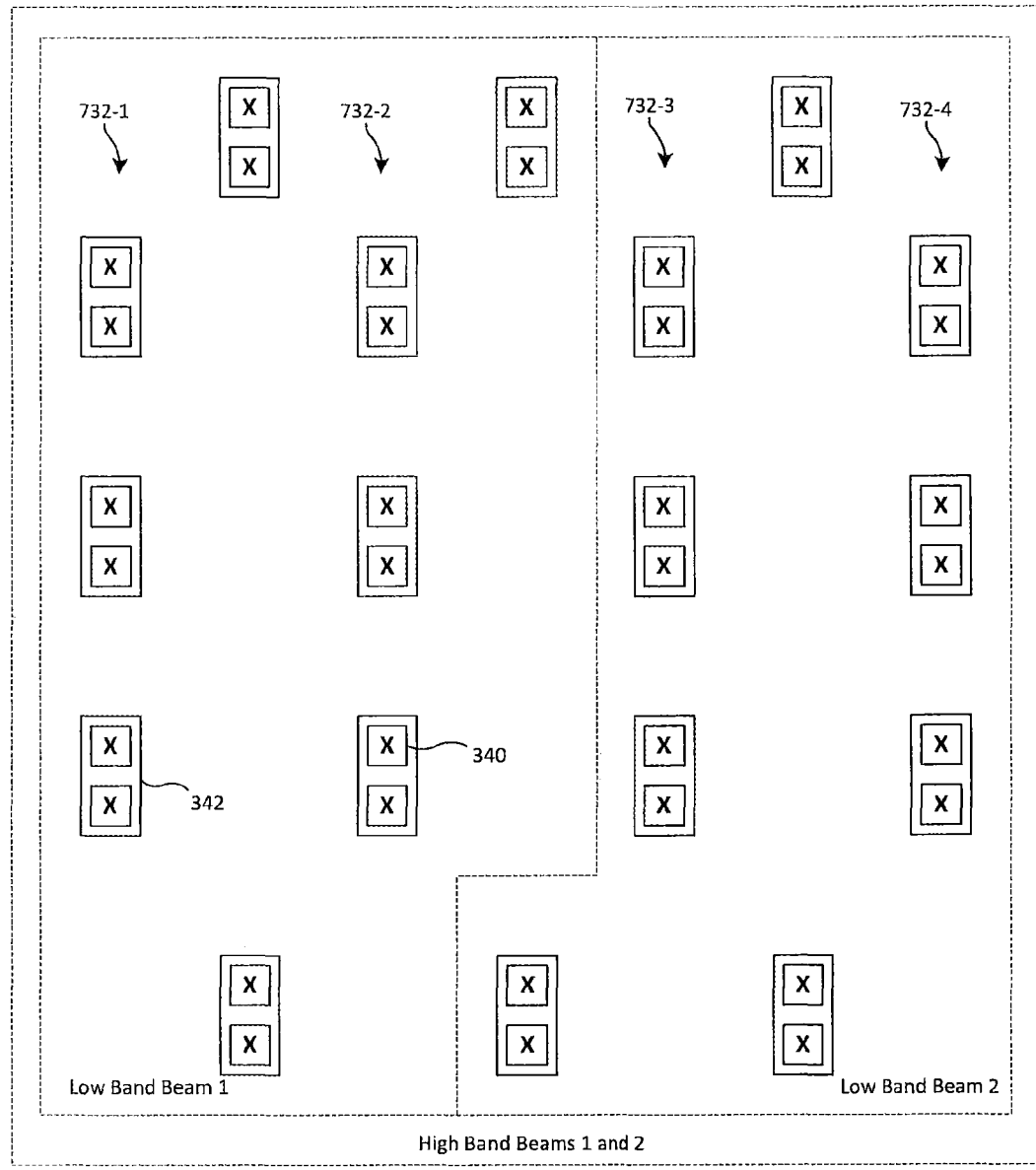
FIG. 9B is a schematic representation of the array of radiating elements included in the base station antenna of FIG. 9A.

FIG. 9B is a simplified version of FIG. 9A that only shows the radiating elements 340 thereof. As shown in FIG. 9B, the antenna 700 may be configured to generate two 120° azimuth HPBW sector antenna beams in the low-band. Two of the radiating elements 340 in each of the top two rows of the array 730, one of the radiating elements 340 in each of the bottom two rows of the array 730, and the radiating elements 340 in columns 732-1 and 732-2 are used to form the first of the two low-band antenna beams. Similarly, the remaining radiating element 340 in each of the top two rows of the array 730, the remaining two radiating elements 340 in each of the bottom two rows of the array 730, and the radiating elements 340 in columns 732-3 and 732-4 are used to form the second of the two low-band antenna beams. All of the radiating elements 340 are used to form the two high-band sector-splitting 60° azimuth HPBW antenna beams. It will be appreciated that FIG. 9B only shows the antenna beams for one of the two polarizations.

The array 730 of radiating elements 340 included in base station antenna 700 is not a perfect matrix of straight rows and columns of radiating elements 340, as the radiating elements 340 in the rows that only have three radiating elements 340 are not vertically aligned (i.e., aligned in the column direction) with the radiating elements 340 in the rows that have four radiating elements 340. For purposes of this disclosure, when rows in an array of radiating elements have different numbers of radiating elements, and the radiating elements in the rows that have fewer radiating elements are in between the columns defined by the outermost radiating elements in the rows that have the most radiating elements, then the radiating elements in the rows that have a reduced number of radiating elements are each considered to be a part of one of the columns of radiating elements defined by the rows that have the full number of radiating elements. In particular, each radiating element in a row that has a reduced number of radiating elements is considered to be a part of the column of radiating elements that the radiating element is commonly fed with. For example, in the embodiment of FIGS. 9A-9B, the radiating elements 340 in sub-array 342-5 would be considered to be part of column 732-1 and the radiating elements 340 in sub-array 342-10 would be considered to be part of column 732-2.

Including rows in the array that only include three (instead of four) radiating elements 340 may increase the azimuth beam width of the low-band arrays. This may make it easier to design an antenna that has appropriate azimuth HPBW values for both the low-band and the high-band. Typically, the rows with only three radiating elements will be located at either or both the top and bottom of the array, although embodiments of the present invention are not limited thereto. Since there are an even number of rows that only have three radiating elements 340, the two sets of sub-arrays 342 that form the two low-band antenna beams will be balanced in the sense that they have the same number of radiating elements 340 and same general structure.

Figure 10:
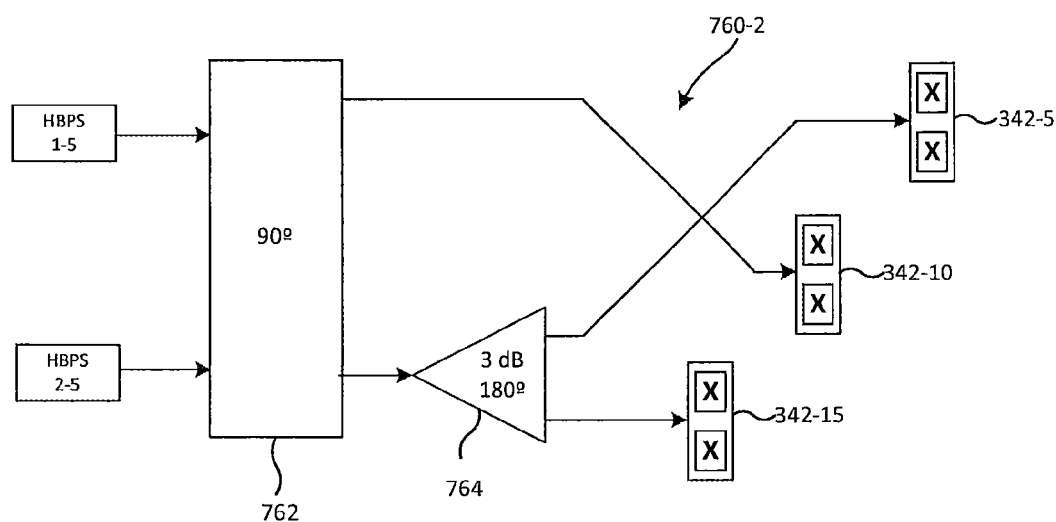
FIG. 10 is a block diagram of a 2×3 beam-forming network that may be used to implement selected ones of the individual beam-forming networks included in the base station antenna of FIG. 9A.

As can be seen in FIG. 9A, beam-forming networks 760-1 and 760-2 are 2×3 beam-forming networks as opposed to 2×4 beam-forming networks. FIG. 10 is a block diagram of a 2×3 beam-forming network that may be used to implement beam-forming network 760-2 (as well as beam-forming network 760-1) in the base station antenna of FIGS. 9A-9B. As shown in FIG. 10, the input ports to beam-forming network 760-2 may comprise one of the outputs from the first high-band phase shifter 354-1 and one of the outputs from the second high-band phase shifter 354-2. These input ports are connected to a 90° hybrid coupler 762. A first output of the 90° hybrid coupler 762 is coupled to a sub-array 342-10 that includes the middle radiating elements 340 in the uppermost two rows of the array 730. The second output of the 90° hybrid coupler 762 is coupled to a 180° coupler 764 such as, for example, a Wilkinson power divider with a 180° Shiffman phase shifter. The first output of the 180° coupler 764 is coupled to a sub-array 342-5 that includes the left-most radiating elements 340 in the uppermost two rows of the array 730. The second output of the 180° coupler 764 is coupled to a sub-array 342-15 that includes the right-most radiating elements 340 in the uppermost two rows of the array 730.

By variation of the splitting coefficient of the 90° hybrid coupler 762, different amplitude distributions can be obtained that may be used to adjust characteristics of the antenna beams including, for example, the azimuth beam widths of the antenna beams. The amplitude distribution may be varied, for example, from uniform (amplitude weights of 1-1-1) to heavily tapered (amplitude weights of 0.4-1-0.4). If the 90° hybrid coupler 762 and the 180° coupler 764 are configured for equal splitting, then an amplitude distribution of 0.7-1-0.7 amplitudes is provided. Thus, it will be understood that the 2×3 beam-forming networks 760-1, 760-2 provide a degree of design flexibility, allowing the creation of different beam shapes and sidelobe levels. The 90° hybrid coupler 762 may be, for example, a branch line coupler, Lange coupler, or coupled line coupler.

Figure 11:
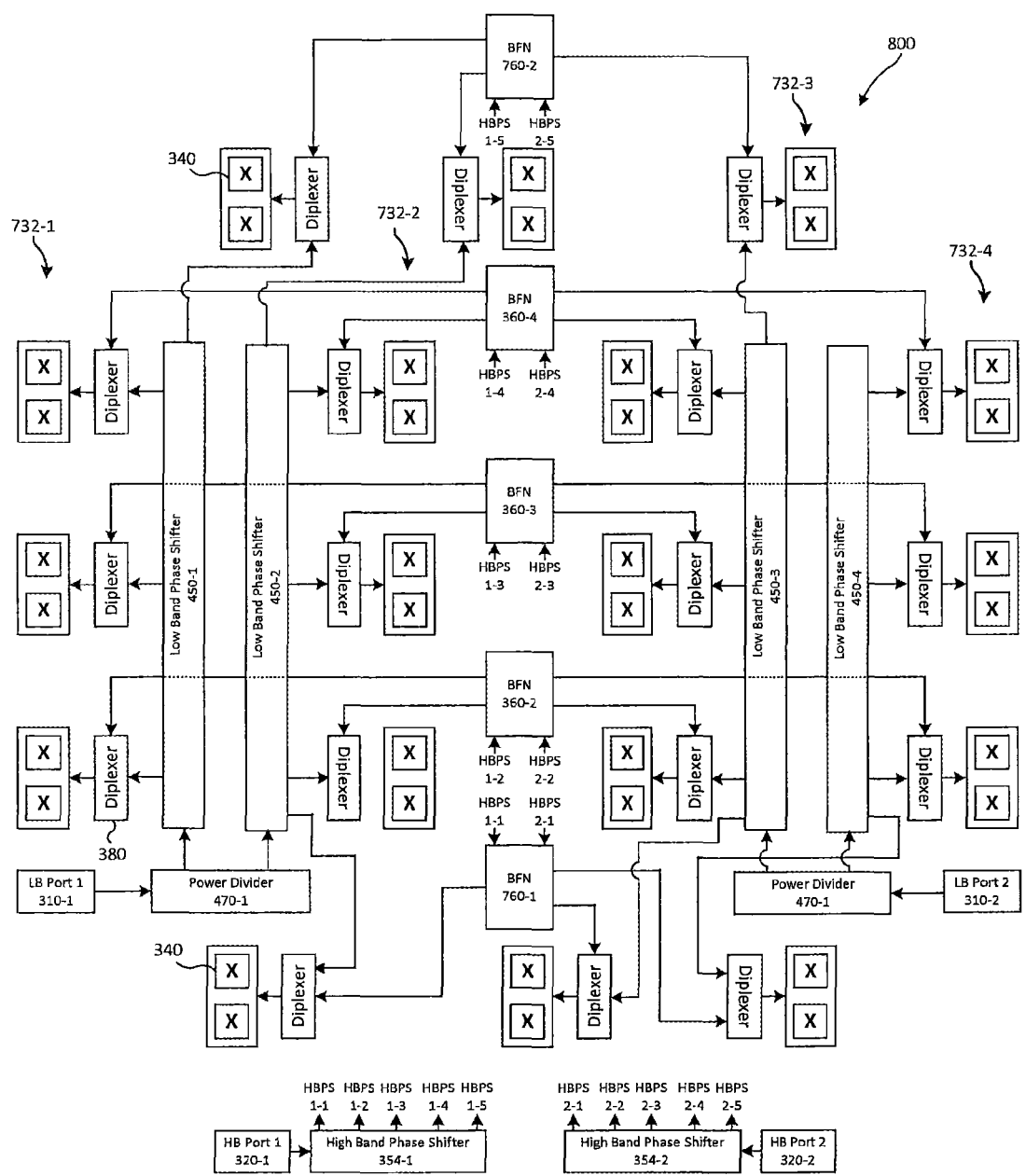
FIG. 11 is a schematic block diagram illustrating a modified version of the base station antenna of FIG. 9A.

FIG. 11 is a schematic block diagram illustrating a base station antenna 800 that is a modified version of the base station antenna of FIG. 9A. FIG. 11 only shows the ports and feed networks for one of the two polarizations to simplify the figure. Note that in FIG. 11 dotted lines are used on the connections between the beam-forming networks 360 and the diplexers 380 to show that these are actual connections, which helps simplify the drawing.

As can be seen by comparing FIGS. 9A and 11, the base station antennas 700 and 800 are very similar to one another, with the only difference between the two being in the design of the low-band feed network and, in particular, in the order in which the phase shifting and power division between columns is performed. Specifically, as in the case of base station antennas 300 and 400 of FIGS. 4 and 6 above, base station antenna 800 is configured to split low-band RF signals that are input at the low-band ports 310 into two sub-components and pass each sub-component to a respective low-band phase shifter that is associated with a particular column 732 of radiating elements 340. This is in contrast to the design of base station antenna 700, where the low-band RF signals that are input at the low-band ports 310 are first split into five sub-components that are variably phase shifted to apply a desired down tilt to the resulting low-band antenna beams, and then the five outputs of each low-band phase shifter 350 are passed to power dividers 370, that further split the signals and pass a sub-component to a sub-array 342 in each of two different columns 732. The power dividers 470 in FIG. 11 may be configured to equally or unequally split RF signals that are input thereto.

The base station antennas according to embodiments of the present invention may allow a single antenna to be used in many cases where previously a cellular operator would have found it necessary to deploy two separate antennas. By using diplexed wideband radiators, two or more different frequency bands may be serviced using a single array of radiating elements, and techniques such as unequal power distribution, including different numbers of radiating elements in some of the rows of the arrays, deploying beam-forming networks with adjustable characteristics, coupling some ports to multiple columns of the array and the like may be used to provide an array having the appropriate azimuth HPBW for both a MIMO sector antenna in a first frequency band and as a sector-splitting antenna in a second frequency band.

While example embodiments have been disclosed above, it will be appreciated that the techniques described herein are widely applicable and that the invention is not limited to the embodiments shown. For example, while the embodiments described above typically have four columns of radiating elements (sometimes with rows having only three radiating elements), it will be appreciated that embodiments with more or fewer columns may be provided. For example, six columns and eight column embodiments (including cases where select rows have less than six or eight radiating elements, respectively) may be implemented for various applications. It likewise will be appreciated that in some cases triplexers may be used and the same array may be used to support service in three different frequency bands.

In the embodiments described above, the low-band is operated as the MIMO sector antenna and the upper band is operated as the sector-splitting antenna. In some applications, the invention may work better with this configuration. However, embodiments od the invention are not limited thereto, as with other frequency bands the opposite arrangement may work better. Thus, in all of the above embodiments, it will be appreciated that the "low-band" may instead be the sector-splitting antenna and the "high-band" may instead be the MIMO antenna.

It will also be appreciated that the frequency bands of operation described above are simply examples. The frequency bands often differ on a country-by-country basis, and/or within different countries, and it will be appreciated that the techniques disclosed herein may be implemented with a wide variety of combinations of different frequency bands. Some additional examples are as follows:

| | |
|---|---|
| Low-band: 1710-1880 MHz; | High-band: 2300-2400 MHz |
| Low-band: 1850-1995 MHz; | High-band: 2496-2690 MHz |
| Low-band: 1695-2180 MHz; | High-band: 2300-2690 MHz |

In the embodiments described above, the spacing between adjacent columns of radiating elements may, for example, be set based on the needs of the upper frequency band, and then various techniques (described above) may be used to obtain a suitable azimuth HPBW for the antenna beams in the lower band. Embodiments of the invention, however, are not limited thereto. For example, as noted above, in some applications it may be appropriate to implement the MIMO sector antenna in the upper band and the sector-splitting antenna in the lower band. This provides one example where the column spacing requirements for the lower frequency band may be used to set the column spacing, and various techniques may be used to adjust the azimuth HPBW of the antenna beams in the upper band.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated operations, elements, and/or components, but do not preclude the presence or addition of one or more other operations, elements, components, and/or groups thereof. As used herein, the term "and/or" includes any and all combinations of one or more of the associated listed items. Like reference numbers signify like elements throughout the description of the figures.

It will be understood that when an element is referred to as being "on," "coupled to" or "connected to" another element, the element may be formed directly on, coupled to or connected to the other element, or there may be one or more intervening elements therebetween.

Terms such as "top," "bottom," "upper," "lower," "above," "below," and the like are used herein to describe the relative positions of elements or features. For example, when an upper part of a drawing is referred to as a "top" and a lower part of a drawing is referred to as a "bottom" for the sake of convenience, in practice, the "top" may also be called a "bottom" and the "bottom" may also be a "top" without departing from the teachings of the inventive concept.

It will be understood that, although the terms "first," "second," etc. may be used herein to describe various elements, these elements should not be limited by these terms. These terms are only used to distinguish one element from another. Thus, a first element could be termed a second element without departing from the teachings of the inventive concept.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A base station antenna, comprising:
a multi-column array of radiating elements;
a first feed network that is configured to pass radio frequency ("RF") signals in a first frequency band to the radiating elements of the multi-column array so that the multi-column array of radiating elements operates as an N×MIMO sector antenna in the first frequency band, where N is an integer greater than or equal to 2;
a second feed network that is configured to pass RF signals in a second frequency band that is different than the first frequency band to the radiating elements of the multi-column array so that the multi-column array of radiating elements operates as a sector-splitting antenna in the second frequency band that generates at least two antenna beams that point in different directions.

2. The base station antenna of claim 1, wherein the multi-column array includes first through fourth columns of radiating elements, and the base station antenna further includes first through fourth RF ports, wherein the first feed network couples the first RF port to the radiating elements in the first and second columns, couples the second RF port to the radiating elements in the third and fourth columns, couples the third RF port to the radiating elements in the first and second columns, and couples the fourth RF port to the radiating elements in the third and fourth columns.

3. The base station antenna of claim 2, wherein the first feed network is configured to unequally divide the RF signals in the first frequency band between the first and second columns of radiating elements, and the second feed network is configured to unequally divide the RF signals in the first frequency band between the third and fourth columns of radiating elements.

4. The base station antenna of claim 2, wherein the second feed network includes a plurality of beam-forming networks, and wherein at least some of the beam-forming networks are coupled to radiating elements in all four of the first through fourth columns of radiating elements.

5. The base station antenna of claim 4, wherein the second feed network is configured pass RF signals in the second frequency band to the radiating elements of the multi-column array so that the multi-column array of radiating elements operates as a 2×MIMO sector-splitting antenna.

6. The base station antenna of claim 2, wherein the first frequency band is a high frequency band and the second frequency band is a low frequency band.

7. The base station antenna of claim 6, wherein a distance between adjacent columns of the multi-column array is between 0.4-0.75 wavelengths of a center frequency of the high frequency band.

8. The base station antenna of claim 2, wherein the first feed network includes a first phase shifter and a first power divider, wherein the first power divider is coupled to at least one radiating element in the first column of radiating elements and at least one radiating element in the second column of radiating elements.

9. The base station antenna of claim 8, wherein the first phase shifter is electrically coupled between the first RF port and the first power divider.

10. The base station antenna of claim 8, wherein the first power divider is electrically coupled between the first RF port and the first phase shifter.

11. The base station antenna of claim 2, wherein the second feed network includes a first phase shifter and a first beam-forming network.

12. The base station antenna of claim 11, wherein the first phase shifter is electrically coupled between the first RF port and the first beam-forming network.

13. The base station antenna of claim 11, wherein the first beam-forming network is electrically coupled between the first RF port and the first phase shifter.

14. The base station antenna of claim 1, wherein the first feed network includes a first power divider network and the second feed network includes a beam-forming network.

15. The base station antenna of claim 1, wherein the multi-column array has a plurality of rows that each include a total of X radiating elements and at least one row that includes a total of Y radiating elements, where Y is less than X.

16. The base station antenna of claim 15, wherein the multi-column array includes an even number of rows that have a total of Y radiating elements.

17. The base station antenna of claim 15, wherein X=4 and Y=3 and N is greater than or equal to 4.

18. The base station antenna of claim 15, wherein at least some of the radiating elements included in rows that have Y radiating elements are not vertically-aligned with columns of the multi-column array defined by the radiating elements included in rows that have X radiating elements.

* * * * *